US010075260B2

(12) United States Patent
Lv et al.

(10) Patent No.: US 10,075,260 B2
(45) Date of Patent: Sep. 11, 2018

(54) POWER CONTROL METHOD, APPARATUS, AND SYSTEM

(71) Applicant: Huawei Technologies Co., Ltd., Shenzhen (CN)

(72) Inventors: Jie Lv, Wuhan (CN); Xiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 14/857,616

(22) Filed: Sep. 17, 2015

(65) Prior Publication Data

US 2016/0013883 A1    Jan. 14, 2016

Related U.S. Application Data

(63) Continuation of application No. PCT/CN2013/073087, filed on Mar. 22, 2013.

(51) Int. Cl.
*H04J 3/10* (2006.01)
*H04L 1/00* (2006.01)
(Continued)

(52) U.S. Cl.
CPC ............. *H04L 1/0001* (2013.01); *H04B 3/06* (2013.01); *H04B 3/32* (2013.01);
(Continued)

(58) Field of Classification Search
CPC .... H04J 3/10; H04B 3/464; H04Q 2011/0049
See application file for complete search history.

(56) References Cited

U.S. PATENT DOCUMENTS 6,377,555 B1 * 4/2002 Lee ............... H04W 52/24
370/252
8,359,059 B2 * 1/2013 Kim ............... H04W 52/10
370/315
(Continued)

FOREIGN PATENT DOCUMENTS

CN      101170331 A     4/2008
CN      101843000 A     9/2010
(Continued)

OTHER PUBLICATIONS

"Series G: Transmission Systems and Media, Digital Systems and Networks; Access networks—Metallic access networks; Fast Access to Subscriber Terminals (FAST)—Physical layer specification," ITU-T G.9701, pp. 1-338, International Telecommunication Union, Geneva, Switzerland (Dec. 2014).

*Primary Examiner* — Hassan Phillips
*Assistant Examiner* — Prenell Jones
(74) *Attorney, Agent, or Firm* — Leydig, Voit & Mayer, Ltd.

(57) ABSTRACT

The present invention discloses a power control method, apparatus, and system. A vectoring control entity acquires a power control factor $D_{ii}^{k}$ of an $i^{th}$ transmit end on a $k^{th}$ subcarrier, where the $i^{th}$ transmit end is one transceiver of M transceivers located at a central office end, $1 \leq k \leq K$, and K indicates a quantity of subcarriers; and sends the power control factor $D_{ii}^{k}$ to the $i^{th}$ transmit end, so that if it is determined, according to the power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'_{i}^{k}$ is less than or equal to the power control factor $D_{ii}^{k}$.

25 Claims, 6 Drawing Sheets

(51) Int. Cl.
*H04W 52/34* (2009.01)
*H04B 3/06* (2006.01)
*H04B 3/32* (2006.01)
*H04L 25/03* (2006.01)
*H04M 11/06* (2006.01)

(52) U.S. Cl.
CPC ..... *H04L 25/03006* (2013.01); *H04M 11/062* (2013.01); *H04W 52/346* (2013.01)

(56) References Cited

U.S. PATENT DOCUMENTS

| | | | |
|---|---|---|---|
| 9,060,054 B2* | 6/2015 | Kerpez | H04B 3/32 |
| 9,185,658 B2* | 11/2015 | Lee | H04W 52/146 |
| 9,398,539 B2* | 7/2016 | Kang | H04B 7/0473 |
| 2004/0125960 A1* | 7/2004 | Fosgate | H04S 3/02 |
| | | | 381/20 |
| 2006/0111050 A1* | 5/2006 | Choi | H01Q 3/267 |
| | | | 455/67.11 |
| 2009/0116582 A1 | 5/2009 | Ashikhmin et al. | |
| 2010/0177838 A1 | 7/2010 | Schenk | |
| 2010/0220626 A1* | 9/2010 | Das | H04W 72/1284 |
| | | | 370/252 |
| 2011/0069774 A1 | 3/2011 | Wang et al. | |
| 2011/0129005 A1* | 6/2011 | Wang | H04L 5/0046 |
| | | | 375/222 |
| 2011/0200080 A1 | 8/2011 | Fang et al. | |
| 2011/0243007 A1* | 10/2011 | Xiao | H04B 7/0447 |
| | | | 370/252 |
| 2012/0027060 A1* | 2/2012 | Singh | H04B 3/32 |
| | | | 375/222 |
| 2015/0071336 A1* | 3/2015 | Kerpez | H04B 3/32 |
| | | | 375/227 |
| 2015/0155914 A1* | 6/2015 | Wahibi | H04B 3/32 |
| | | | 370/201 |
| 2015/0245304 A1* | 8/2015 | Pelletier | H04W 52/367 |
| | | | 370/335 |

FOREIGN PATENT DOCUMENTS

| | | |
|---|---|---|
| CN | 101868010 A | 10/2010 |
| CN | 102282775 A | 12/2011 |
| CN | 102318299 A | 1/2012 |
| RU | 2347329 C2 | 2/2009 |
| WO | WO 2011084253 A1 | 7/2011 |
| WO | WO 2012102917 A1 | 8/2012 |

* cited by examiner

POWER CONTROL METHOD, APPARATUS, AND SYSTEM

CROSS-REFERENCE TO RELATED APPLICATIONS

This application is a continuation of International Patent Application No. PCT/CN2013/073087, filed on Mar. 22, 2013, which is hereby incorporated by reference in its entirety.

TECHNICAL FIELD

Embodiments of the present invention relate to the field of communications technologies, and in particular, to a power control method, apparatus, and system.

BACKGROUND

At present, a vectoring crosstalk cancellation (Vectoring) system includes a central office end and a far end. The central office end includes multiple (M) transceivers, and the far end includes multiple (M) transceivers. During downlink transmission, the M transceivers of the central office end serve as transmit ends, the M transceivers of the far end serve as receive ends, and each transmit end is corresponding to one receive end.

Generally, power or a power spectral density (PSD for short) of a signal sent by a transmit end is under strict control. For example, total power of transmit signals must not exceed a limit of a specified maximum value. For another example, power (that is, power spectral density, PSD) of a transmit signal on each subcarrier is controlled by a PSD profile.

Due to a requirement for power control, it is required that a precoder located at a transmit end does not increase transmit power. In the prior art, a normalization factor $\lambda$ is used to perform normalized power control on a precoding matrix P used by a precoder to obtain that $\overline{P}=\lambda \cdot P$, where $\lambda$ is a number less than or equal to 1, and $\overline{P}$ is a precoding matrix after power control is performed. Because $\lambda$ is a number less than or equal to 1, a sum of squared elements of each row in the precoding matrix $\overline{P}$ after power control is performed may be less than or equal to 1, and therefore, the precoding matrix $\overline{P}$ after power control is performed does not increase transmit power, so that a transmit signal, passing through the precoder, of each line can meet a requirement for control of transmit power.

After a precoder uses a normalization factor $\lambda$, which is equivalent to that all transmit signals are multiplied by $\lambda$, a signal received by a receive end is distorted, and therefore, a receive end needs to use a recovery factor $1/\lambda$ to recover a received signal, that is, a frequency domain equalizer (FEQ for short) matrix of an FEQ needs to be multiplied by the recovery factor $1/\lambda$.

To recover a transmit signal at a receive end, in addition to multiplying a precoding matrix P by a normalization factor $\lambda$, an FEQ matrix must be multiplied by a recovery factor $1/\lambda$; otherwise, when the normalization factor $\lambda$ is applied in the precoder and the recovery factor $1/\lambda$ is not applied in the FEQ matrix, a receive signal is distorted. However, the precoding matrix P is multiplied by the normalization factor $\lambda$ at a transmit end, the FEQ matrix is multiplied by the recovery factor $1/\lambda$ at a receive end, and it is relatively complex to strictly control application of the normalization factor $\lambda$ in the precoder and application of the recovery factor $1/\lambda$ in the FEQ to occur at the same time, thereby increasing complexity of power control.

Further, in the foregoing power control method, all elements in the precoding matrix P are multiplied by the normalization factor $\lambda$, which is equivalent to that transmit signals in all lines are multiplied by the normalization factor $\lambda$ for reduction and weakening. When crosstalk signals of only a few lines are very strong (that is, only some elements in the precoding matrix P are very large), the foregoing power control weakens transmit signals of other lines whose crosstalk signals are not strong, which reduces signal transmission performance of an entire line.

Therefore, the power control method in the prior art has problems that control is complex and signal transmission performance of an entire line is reduced.

SUMMARY

The present invention provides a power control method, apparatus, and system, which can resolve a problem, existing in a power control method in the prior art, that control is complex and signal transmission performance of an entire line is reduced.

According to a first aspect, the present invention provides a power control method, applied in a vectoring crosstalk cancellation system, including:

acquiring, by a vectoring control entity, a power control factor $D_{ii}^k$ of an $i^{th}$ transmit end on a $k^{th}$ subcarrier, where the $i^{th}$ transmit end is one transceiver of M transceivers located at a central office end, $1 \leq k \leq K$, and K indicates a quantity of subcarriers; and sending the power control factor $D_{ii}^k$ to the $i^{th}$ transmit end, so that if it is determined that the power control factor $D_{ii}^k$ is less than a power gain factor $g_i^k$, of a current transmit signal of the $i^{th}$ transmit end, on the $k^{th}$ subcarrier, the $i^{th}$ transmit end modifies the power gain factor $g_i^k$ of the current transmit signal, so that a modified power gain factor $g'^k_i$ is less than or equal to the power control factor $D_{ii}^k$.

Based on the first aspect, in a first possible implementation manner, the acquiring, by a vectoring control entity, a power control factor $D_{ii}^k$ of an $i^{th}$ transmit end on a $k^{th}$ subcarrier includes:

sending, by the vectoring control entity, the power control factor $D_{ii}^k$ to an $i^{th}$ receive end, where the $i^{th}$ receive end is one transceiver, corresponding to the $i^{th}$ transmit end, of M transceivers located at a far end, so that if it is determined that the power control factor $D_{ii}^k$ is less than a power gain factor $g_i^k$, of the current transmit signal of the $i^{th}$ transmit end, on the $k^{th}$ subcarrier, the $i^{th}$ receive end modifies the power gain factor $g_i^k$ of the current transmit signal, so that a modified power gain factor $g'^k_i$ is less than or equal to the power control factor $D_{ii}^k$, and sends the modified power gain factor $g'^k_i$ to the $i^{th}$ transmit end.

Based on the first aspect or the first possible implementation manner of the first aspect, in a second possible implementation manner, the acquiring, by a vectoring control entity, a power control factor $D_{ii}^k$ of an $i^{th}$ transmit end on a $k^{th}$ subcarrier, includes:

acquiring, by the vectoring control entity, a precoding matrix $P^k$ on the $k^{th}$ subcarrier; and calculating the power control factor $D_{ii}^k$ of an $i^{th}$ transmit end on the $k^{th}$ subcarrier by using an $i^{th}$ row vector and an $i^{th}$ column vector of the matrix $P^k$.

Based on the first or the second possible implementation manner of the first aspect, in a third possible implementation manner, after the sending the power control factor $D_{ii}^k$ to the $i^{th}$ transmit end, or after the sending, by the vectoring control entity, the power control factor $D_{ii}^{k}$ to an $i^{th}$ receive end, the method includes:

receiving, by the vectoring control entity, a power limit response message sent by the $i^{th}$ transmit end.

According to a second aspect, the present invention provides a power control method, applied in a vectoring crosstalk cancellation system, including:

receiving, by an $i^{th}$ transmit end, a power control factor $D_{ii}^{k}$ sent by a vectoring control entity, where the power control factor $D_{ii}^{k}$ is a power control factor, acquired by the vectoring control entity, of the $i^{th}$ transmit end on a $k^{th}$ subcarrier, the $i^{th}$ transmit end is one transceiver of M transceivers located at a central office end, $1 \le k \le K$, and K indicates a quantity of subcarriers; and if it is determined that the power control factor $D_{ii}^{k}$ is less than a power gain factor $g_{i}^{k}$, of a current transmit signal of the $i^{th}$ transmit end, on the $k^{th}$ subcarrier, modifying the power gain factor $g_{i}^{k}$ of the current transmit signal, so that a modified power gain factor $g'_{i}^{k}$ is less than or equal to the power control factor $D_{ii}^{k}$.

Based on the second aspect, in a first possible implementation manner, after the modifying the power gain factor $g_{i}^{k}$ of the current transmit signal, the method includes:

updating, by the $i^{th}$ transmit end, a physical layer parameter of a line between the $i^{th}$ transmit end and an $i^{th}$ receive end according to the modified power gain factor $g'_{i}^{k}$, where the $i^{th}$ receive end is one transceiver, corresponding to the $i^{th}$ transmit end, of M transceivers located at a far end; and sending the updated physical layer parameter to the $i^{th}$ receive end, so that the $i^{th}$ receive end receives the updated physical layer parameter, and returns a physical layer parameter update response message to the $i^{th}$ transmit end.

Based on the second aspect, in a second possible implementation manner, after the modifying the power gain factor $g_{i}^{k}$ of the current transmit signal, the method includes:

sending, by the $i^{th}$ transmit end, the modified power gain factor $g'_{i}^{k}$ to an $i^{th}$ receive end, so that the $i^{th}$ receive end updates a physical layer parameter of a line between the $i^{th}$ transmit end and an $i^{th}$ receive end according to the modified power gain factor $g_{i}^{k}$, and sends the updated physical layer parameter to the $i^{th}$ transmit end; and receiving the updated physical layer parameter sent by the $i^{th}$ receive end, and sending a physical layer parameter update response message to the $i^{th}$ receive end.

Based on the second aspect or the first or the second possible implementation manner of the second aspect, in a third possible implementation manner, after the modifying the power gain factor $g_{i}^{k}$ of the current transmit signal, the method includes:

sending, by the $i^{th}$ transmit end, a power limit response message to the vectoring control entity.

According to a third aspect, the present invention provides a power control method, applied in a vectoring crosstalk cancellation system, including:

receiving, by an $i^{th}$ receive end, a power control factor $D_{ii}^{k}$ sent by a vectoring control entity, where the power control factor $D_{ii}^{k}$ is a power control factor, acquired by the vectoring control entity, of an $i^{th}$ transmit end on a $k^{th}$ subcarrier, the $i^{th}$ transmit end is one transceiver of M transceivers located at a central office end, $1 \le k \le K$, K indicates a quantity of subcarriers, and the $i^{th}$ receive end is one transceiver, corresponding to the $i^{th}$ transmit end, of M transceivers located at a far end;

if it is determined that the power control factor $D_{ii}^{k}$ is less than a power gain factor $g_{i}^{k}$, of a current transmit signal of the $i^{th}$ transmit end, on the $k^{th}$ subcarrier, modifying the power gain factor $g_{i}^{k}$ of the current transmit signal, so that a modified power gain factor $g'_{i}^{k}$ is less than or equal to the power control factor $D_{ii}^{k}$; and sending the modified power gain factor $g'_{i}^{k}$ to the $i^{th}$ transmit end.

Based on the third aspect, in a first possible implementation manner, before the sending the modified power gain factor $g'_{i}^{k}$ to the $i^{th}$ transmit end, the method includes:

updating, by the $i^{th}$ receive end, a physical layer parameter of a line between the $i^{th}$ transmit end and the $i^{th}$ receive end according to the modified power gain factor $g_{i}^{k}$;

sending the updated physical layer parameter to the $i^{th}$ transmit end, where the updated physical layer parameter includes the modified power gain factor $g'_{i}^{k}$; and receiving a physical layer parameter update response message sent by the $i^{th}$ transmit end.

Based on the third aspect, in a second possible implementation manner, after the sending the modified power gain factor $g'_{i}^{k}$ to the $i^{th}$ transmit end, the method includes:

receiving, by the $i^{th}$ receive end, an updated physical layer parameter sent by the $i^{th}$ transmit end, where the updated physical layer parameter is a physical layer parameter, of a line between the $i^{th}$ transmit end and the $i^{th}$ receive end, updated by the $i^{th}$ transmit end according to the modified power gain factor $g'_{i}^{k}$; and returning a physical layer parameter update response message to the $i^{th}$ transmit end.

According to a fourth aspect, the present invention provides a power control apparatus, located at a vectoring control entity and applied in a vectoring crosstalk cancellation system, including:

an acquiring module, configured to acquire a power control factor $D_{ii}^{k}$ of an $i^{th}$ transmit end on a $k^{th}$ subcarrier, where the $i^{th}$ transmit end is one transceiver of M transceivers located at a central office end, $1 \le k \le K$, and K indicates a quantity of subcarriers; and a sending module, configured to send, to the $i^{th}$ transmit end, the power control factor $D_{ii}^{k}$ acquired by the acquiring module, so that if it is determined that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'_{i}^{k}$ is less than or equal to the power control factor $D_{ii}^{k}$.

Based on the fourth aspect, in a first possible implementation manner, after the acquiring module acquires the power control factor $D_{ii}^{k}$ of the $i^{th}$ transmit end on the $k^{th}$ subcarrier, the sending module is further configured to send the power control factor $D_{ii}^{k}$ to an $i^{th}$ receive end, where the $i^{th}$ receive end is one transceiver, corresponding to the $i^{th}$ transmit end, of M transceivers located at a far end, so that if it is determined that the power control factor $D_{ii}^{k}$ is less than a power gain factor $g_{i}^{k}$, of the current transmit signal of the $i^{th}$ transmit end, on the $k^{th}$ subcarrier, the $i^{th}$ receive end modifies the power gain factor $g_{i}^{k}$ of the current transmit signal, so that a modified power gain factor $g'_{i}^{k}$ is less than or equal to the power control factor $D_{ii}^{k}$, and sends the modified power gain factor $g'_{i}^{k}$ to the $i^{th}$ transmit end.

Based on the fourth aspect or the first possible implementation manner of the fourth aspect, in a second possible implementation manner, the acquiring module is specifically configured to:

acquire a precoding matrix $P^{k}$ on the $k^{th}$ subcarrier; and calculate the power control factor $D_{ii}^{k}$ of the $i^{th}$ transmit end on the $k^{th}$ subcarrier by using an $i^{th}$ row vector and an $i^{th}$ column vector of the matrix $P^{k}$.

Based on the fourth aspect or the first or the second possible implementation manner of the fourth aspect, in a third possible implementation manner, the apparatus further includes:

a receiving module, configured to receive a power limit response message sent by the $i^{th}$ transmit end.

According to a fifth aspect, the present invention provides a power control apparatus, located at a transmit end and applied in a vectoring crosstalk cancellation system, where the transmit end is one transceiver of M transceivers located at a central office end, and the power control apparatus includes:

a receiving module, configured to receive a power control factor $D_{ii}^{k}$ sent by a vectoring control entity, where the power control factor $D_{ii}^{k}$ is a power control factor, acquired by the vectoring control entity, of the transmit end on a $k^{th}$ subcarrier, $1 \leq i \leq M$, i indicates a serial number of the transmit end, $1 \leq k \leq K$, and K indicates a quantity of subcarriers; and a modifying module, configured to: if it is determined that the power control factor $D_{ii}^{k}$ is less than a power gain factor $g_i^{k}$, of a current transmit signal of the transmit end, on the $k^{th}$ subcarrier, modify the power gain factor $g_i^{k}$ of the current transmit signal, so that a modified power gain factor $g'_i^{k}$ is less than or equal to the power control factor $D_{ii}^{k}$.

Based on the fifth aspect, in a first possible implementation manner, after the modifying module modifies the power gain factor $g_i^{k}$ of the current transmit signal, the apparatus further includes:

an update module, configured to update a physical layer parameter of a line between the transmit end and a corresponding receive end according to the power gain factor $g'_i^{k}$ modified by the modifying module, where the corresponding receive end is one transceiver, corresponding to the transmit end, of M transceivers located at a far end; and a sending module, configured to send, to the corresponding receive end, the physical layer parameter updated by the update module, so that the corresponding receive end receives the updated physical layer parameter, and returns a physical layer parameter update response message to the transmit end.

Based on the fifth aspect or the first possible implementation manner of the fifth aspect, in a second possible implementation manner, after the modifying module modifies the power gain factor $g_i^{k}$ of the current transmit signal, the sending module is further configured to send the modified power gain factor $g'_i^{k}$ to the corresponding receive end, so that the corresponding receive end updates a physical layer parameter between a line between the corresponding receive end and the transmit end according to the modified power gain factor $g'_i^{k}$, and sends the updated physical layer parameter to the transmit end; and the receiving module is further configured to receive the updated physical layer parameter sent by the corresponding receive end, so that the sending module sends a physical layer parameter update response message to the corresponding receive end.

Based on the fifth aspect or the first or the second possible implementation manner of the fifth aspect, in a third possible implementation manner, after the modifying module modifies the power gain factor $g_i^{k}$ of the current transmit signal, the sending module is further configured to send a power limit response message to the vectoring control entity.

According to a sixth aspect, the present invention provides a power control apparatus, located at a receive end and applied in a vectoring crosstalk cancellation system, where the receive end is one transceiver of M transceivers located at a far end, and the power control apparatus includes:

a receiving module, configured to receive a power control factor $D_{ii}^{k}$ sent by a vectoring control entity, where the power control factor $D_{ii}^{k}$ is a power control factor, acquired by the vectoring control entity, of an $i^{th}$ transmit end on a $k^{th}$ subcarrier, the $i^{th}$ transmit end is one transceiver, corresponding to the receive end, of M transceivers located at a central office end, $1 \leq k \leq K$, and K indicates a quantity of subcarriers; and a modifying module, configured to: if it is determined that the power control factor $D_{ii}^{k}$ is less than a power gain factor $g_i^{k}$, of a current transmit signal of the $i^{th}$ transmit end, on the $k^{th}$ subcarrier, modify the power gain factor $g_i^{k}$ of the current transmit signal, so that a modified power gain factor $g'_i^{k}$ is less than or equal to the power control factor $D_{ii}^{k}$; and a sending module, configured to send the modified power gain factor $g'_i^{k}$ to the $i^{th}$ transmit end.

Based on the sixth aspect, in a first possible implementation manner, before the sending module sends the modified power gain factor $g'_i^{k}$ to the $i^{th}$ transmit end; the apparatus further includes:

an update module, configured to update a physical layer parameter of a line between the $i^{th}$ transmit end and an $i^{th}$ receive end according to the modified power gain factor $g'_i^{k}$; where the sending module is further configured to send the updated physical layer parameter to the $i^{th}$ transmit end, where the updated physical layer parameter includes the modified power gain factor $g'_i^{k}$; and the receiving module is further configured to receive a physical layer parameter update response message sent by the $i^{th}$ transmit end.

Based on the sixth aspect, in a second possible implementation manner, after the sending module sends the modified power gain factor $g_i^{k}$ to the $i^{th}$ transmit end, the receiving module is further configured to receive an updated physical layer parameter sent by the $i^{th}$ transmit end, where the updated physical layer parameter is a physical layer parameter, of a line between the $i^{th}$ transmit end and the receive end, updated by the $i^{th}$ transmit end according to the modified power gain factor $g'_i^{k}$; and the sending module is further configured to return a physical layer parameter update response message to the $i^{th}$ transmit end.

According to a seventh aspect, the present invention provides a power control system, applied in a vectoring crosstalk cancellation system, including a vectoring control entity, M transmit ends, and M receive ends, where the M transmit ends are M transceivers located at a central office end, the M receive ends are M transceivers located at a far end, and the M transmit ends are corresponding, in a one-to-one manner, to the M receive ends;

the vectoring control entity includes the power control apparatus according to the fourth aspect;

any transmit end of the M transmit ends includes the power control apparatus according to the fifth aspect; and any receive end of the M receive ends includes the power control apparatus according to the sixth aspect.

According to an eighth aspect, the present invention provides a vectoring control entity, applied in a vectoring crosstalk cancellation system, including a processor, a memory, and a communications bus, where the memory stores an instruction for implementing a power control method, and the processor is connected to the memory through the communications bus; and when the processor invokes the instruction in the memory, the following steps are executed:

acquiring a power control factor $D_{ii}^k$ of an $i^{th}$ transmit end on a $k^{th}$ subcarrier, where the $i^{th}$ transmit end is one transceiver of M transceivers located at a central office end, $1 \leq k \leq K$, and K indicates a quantity of subcarriers; and sending the power control factor $D_{ii}^k$ to the $i^{th}$ transmit end, so that if it is determined that the power control factor $D_{ii}^k$ is less than a power gain factor $g_i^k$, of a current transmit signal of the $i^{th}$ transmit end, on the $k^{th}$ subcarrier, the $i^{th}$ transmit end modifies the power gain factor $g_i^k$ of the current transmit signal, so that a modified power gain factor $g'^k_i$ is less than or equal to the power control factor $D_{ii}^k$.

Based on the eighth aspect, in a first possible implementation manner, after the acquiring a power control factor $D_{ii}^k$ of an $i^{th}$ transmit end on a $k^{th}$ subcarrier, the steps include:

sending the power control factor $D_{ii}^k$ to an $i^{th}$ receive end, where the $i^{th}$ receive end is one transceiver, corresponding to the $i^{th}$ transmit end, of M transceivers located at a far end, so that if it is determined that the power control factor $D_{ii}^k$ is less than a power gain factor $g_i^k$, of the current transmit signal of the $i^{th}$ transmit end, on the $k^{th}$ subcarrier, the $i^{th}$ receive end modifies the power gain factor $g_i^k$ of the current transmit signal, so that a modified power gain factor $g'^k_i$ is less than or equal to the power control factor $D_{ii}^k$, and sends the modified power gain factor $g'^k_i$ to the $i^{th}$ transmit end.

Based on the eighth aspect or the first possible implementation manner of the eighth aspect, in a second possible implementation manner, the acquiring a power control factor $D_{ii}^k$ of an $i^{th}$ transmit end on a $k^{th}$ subcarrier includes:

acquiring a precoding matrix $P^k$ on the $k^{th}$ subcarrier; and calculating the power control factor $D_{ii}^k$ of the $i^{th}$ transmit end on the $k^{th}$ subcarrier by using an $i^{th}$ row vector and an $i^{th}$ column vector of the matrix $P^k$.

Based on the eighth aspect or the second possible implementation manner of the eighth aspect, in a third possible implementation manner, after the sending the power control factor $D_{ii}^k$ to the $i^{th}$ transmit end, or after the sending, by the vectoring control entity, the power control factor $D_{ii}^k$ to an $i^{th}$ receive end, the steps include:

receiving a power limit response message sent by the $i^{th}$ transmit end.

According to a ninth aspect, the present invention provides a transmit end, applied in a vectoring crosstalk cancellation system, where the transmit end is one transceiver of M transceivers located at a central office end, and the transmit end includes a processor, a memory, and a communications bus, where the memory stores an instruction for implementing a power control method, and the processor is connected to the memory through the communications bus; and when the processor invokes the instruction in the memory, the following steps are executed:

receiving a power control factor $D_{ii}^k$ sent by a vectoring control entity, where the power control factor $D_{ii}^k$ is a power control factor, acquired by the vectoring control entity, of the transmit end on a $k^{th}$ subcarrier, i indicates a serial number of the transmit end, $1 \leq k \leq K$, and K indicates a quantity of subcarriers; and if it is determined that the power control factor $D_{ii}^k$ is less than a power gain factor $g_i^k$, of a current transmit signal of the $i^{th}$ transmit end, on the $k^{th}$ subcarrier, modifying the power gain factor $g_i^k$ of the current transmit signal, so that a modified power gain factor $g'^k_i$ is less than or equal to the power control factor $D_{ii}^k$.

Based on the ninth aspect, in a first possible implementation manner, after the modifying the power gain factor $g_i^k$ of the current transmit signal, the steps include:

updating a physical layer parameter of a line between the transmit end and an $i^{th}$ receive end according to the modified power gain factor $g'^k_i$, where the $i^{th}$ receive end is one transceiver, corresponding to the transmit end, of M transceivers located at a far end; and sending the updated physical layer parameter to the $i^{th}$ receive end, so that the $i^{th}$ receive end accepts the updated physical layer parameter, and returns a physical layer parameter update response message to the transmit end.

Based on the ninth aspect or the first possible implementation manner of the ninth aspect, in a second possible implementation manner, after the modifying the power gain factor $g_i^k$ of the current transmit signal, the steps include:

sending the modified power gain factor $g'^k_i$ to the $i^{th}$ receive end, so that the $i^{th}$ receive end updates a physical layer parameter of a line between the transmit end and the $i^{th}$ receive end according to the modified power gain factor $g'^k_i$, and sends the updated physical layer parameter to the transmit end; and receiving the updated physical layer parameter sent by the $i^{th}$ receive end, and sending a physical layer parameter update response message to the $i^{th}$ receive end.

Based on the ninth aspect or the first or the second possible implementation manner of the ninth aspect, in a third possible implementation manner, after the modifying the power gain factor $g_i^k$ of the current transmit signal, the steps include:

sending a power limit response message to the vectoring control entity.

According to a tenth aspect, the present invention provides a receive end, applied in a vectoring crosstalk cancellation system, where the receive end is one transceiver of M transceivers located at a far end, and the receive end includes a processor, a memory, and a communications bus, where the memory stores an instruction for implementing a power control method, and the processor is connected to the memory through the communications bus; and when the processor invokes the instruction in the memory, the following steps are executed:

receiving a power control factor $D_{ii}^k$ sent by a vectoring control entity, where the power control factor $D_{ii}^k$ is a power control factor, acquired by the vectoring control entity, of an $i^{th}$ transmit end on a $k^{th}$ subcarrier, the $i^{th}$ transmit end is one transceiver, corresponding to the receive end, of M transceivers located at a central office end, $1 \leq k \leq K$, and K indicates a quantity of subcarriers;

if it is determined that the power control factor $D_{ii}^k$ is less than a power gain factor $g_i^k$, of a current transmit signal of the $i^{th}$ transmit end, on the $k^{th}$ subcarrier, modifying the power gain factor $g_i^k$ of the current transmit signal, so that a modified power gain factor $g_i^k$ is less than or equal to the power control factor $D_{ii}^k$; and sending the modified power gain factor $g'^k_i$ to the $i^{th}$ transmit end.

Based on the tenth aspect, in a first possible implementation manner, before the sending the modified power gain factor $g'^k_i$ to the $i^{th}$ transmit end, the steps include:

updating a physical layer parameter of a line between the $i^{th}$ transmit end and the receive end according to the modified power gain factor $g_i^k$;

sending the updated physical layer parameter to the $i^{th}$ transmit end, where the updated physical layer parameter includes the modified power gain factor $g'^k_i$; and receiving a physical layer parameter update response message sent by the $i^{th}$ transmit end.

Based on the tenth aspect, in a second possible implementation manner, after the sending the modified power gain factor $g'^k_i$ to the $i^{th}$ transmit end, the steps include:

receiving an updated physical layer parameter sent by the $i^{th}$ transmit end, where the updated physical layer parameter is a physical layer parameter, of a line between the $i^{th}$ transmit end and the receive end, updated by the $i^{th}$ transmit end according to the modified power gain factor $g'^k_i$; and returning a physical layer parameter update response message to the $i^{th}$ transmit end.

In the present invention, a vectoring control entity acquires a power control factor $D_{ii}^k$ of an $i^{th}$ transmit end on a $k^{th}$ subcarrier; and sends the power control factor $D_{ii}^k$ to the $i^{th}$ transmit end, so that if it is determined, according to the received power control factor $D_{ii}^k$, that the power control factor $D_{ii}^k$ is less than a power gain factor $g_i^k$, of a current transmit signal of the $i^{th}$ transmit end, on the $k^{th}$ subcarrier, the $i^{th}$ transmit end modifies the power gain factor $g_i^k$ of the current transmit signal, so that a modified power gain factor $g'^k_i$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention are applied in a vectoring crosstalk cancellation (Vectoring) system. The vectoring crosstalk cancellation (Vectoring) system includes a central office end and a far end. The central office end includes M transceivers, and the far end includes M transceivers.

During downlink transmission, the M transceivers located at the central office end serve as transmit ends, the M transceivers located at the far end serve as receive ends, and each transmit end is corresponding to one receive end.

Figure 1:
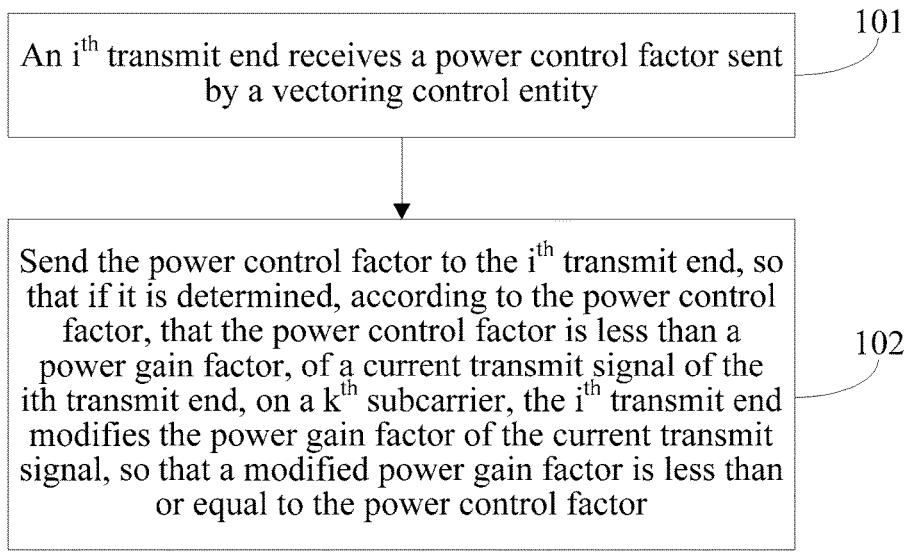
FIG. 1 is a schematic flowchart of a power control method according to an embodiment of the present invention.

FIG. 1 is a schematic flowchart of a power control method according to an embodiment of the present invention. As shown in FIG. 1, the power control method in this embodiment may include:

101. A vectoring control entity acquires a power control factor of an $i^{th}$ transmit end on a $k^{th}$ subcarrier.

$D_{ii}^k$ indicates the power control factor of the $i^{th}$ transmit end on the $k^{th}$ subcarrier.

The $i^{th}$ transmit end is one transceiver of M transceivers located at a central office end, $1 \leq k \leq K$, and K indicates a quantity of subcarriers.

In an implementation manner of the present invention, that a vectoring control entity acquires a power control factor $D_{ii}^k$ Of an $i^{th}$ transmit end on a $k^{th}$ subcarrier includes:

acquiring, by the vectoring control entity, a precoding matrix $P^k$ on the $k^{th}$ subcarrier; during specific implementation, for example, an error sample (ES) and a pilot sequence (PS) on the $k^{th}$ subcarrier are acquired to obtain a normalized channel matrix on the $k^{th}$ subcarrier; for details, reference may be made to related specifications in a vectoring crosstalk cancellation (VECTOR) G993.5 system, which is not described again.

The normalized channel matrix on the $k^{th}$ subcarrier is an estimate of a matrix $FEQ^k \cdot H^k$, and is expressed as: $H_{eq}^k = FEQ^k \cdot H^k$.

Generally, the matrix $FEQ^k$ is the reciprocal of a diagonal of a channel matrix $H^k$, and therefore $H_{eq}^k$ is a normalized channel matrix in which values of diagonal elements are all is.

Then, the precoding matrix $P^k$ i $H_{eq}^{k-1}$ is obtained by finding the inverse of $H_{eq}^k$.

The vectoring control entity calculates the power control factor $D_{ii}^k$ of the $i^{th}$ transmit end on the $k^{th}$ subcarrier by using an $i^{th}$ row vector and an $i^{th}$ column vector of the matrix $P^k$. During specific implementation, for example, a formula $D_{ii}^k = 1/\max(\|P_i^k\|_2, \|P_i^{kT}\|_2)$ is used to calculate the power control factor $D_{ii}^k$ of the $i^{th}$ transmit end on the $k^{th}$ subcarrier.

$P_i^k$ indicates an $i^{th}$ row vector, of the precoding matrix P, on the $k^{th}$ subcarrier, $\|P_i^k\|_2$ indicates a second order norm of the $i^{th}$ row vector in the precoding matrix P on the $k^{th}$ subcarrier, that is, a square root of a sum of squared elements of a row vector, and $\|P_i^{kT}\|_2$ indicates a second-order norm of an $i^{th}$ row vector of the transpose of the precoding matrix P on the $k^{th}$ subcarrier.

102. Send the power control factor to the $i^{th}$ transmit end, so that if it is determined, according to the power control factor, that the power control factor is less than a power gain factor, of a current transmit signal of the $i^{th}$ transmit end, on the $k^{th}$ subcarrier, the $i^{th}$ transmit end modifies the power gain factor of the current transmit signal, so that a modified power gain factor is less than or equal to the power control factor.

In an optional implementation manner of the present invention, after that a vectoring control entity acquires a power control factor $D_{ii}^{k}$ of an $i^{th}$ transmit end on a $k^{th}$ subcarrier, the method includes:

sending, by the vectoring control entity, the power control factor $D_{ii}^{k}$ to the $i^{th}$ transmit end, so that if it is determined, according to the power control factor $D_{ii}^{k}$, that the power control factor $D_{ii}^{k}$ is less than the power gain factor $g_i^{k}$, of the current transmit signal of the $i^{th}$ transmit end, on the $k^{th}$ subcarrier, the $i^{th}$ transmit end modifies the power gain factor $g_i^{k}$ of the current transmit signal, so that the modified power gain factor $g'_i^{k}$ is less than or equal to the power control factor $D_{ii}^{k}$.

In an implementation manner of the present invention, after the $i^{th}$ transmit end modifies the power gain factor $g_i^{k}$ of the current transmit signal, the $i^{th}$ transmit end and an $i^{th}$ receive end need to negotiate, according to the modified power gain factor $g'_i^{k}$, a new physical layer parameter of a line between the $i^{th}$ transmit end and the $i^{th}$ receive end, which specifically includes:

updating, by the $i^{th}$ transmit end, a physical layer parameter of the line between the $i^{th}$ transmit end and the $i^{th}$ receive end according to the modified power gain factor $g'_i^{k}$, where the $i^{th}$ receive end is one transceiver, corresponding to the $i^{th}$ transmit end, of M transceivers located at a far end; and sending the updated physical layer parameter to the $i^{th}$ receive end, so that the $i^{th}$ receive end accepts the updated physical layer parameter, and returns a physical layer parameter update response message to the $i^{th}$ transmit end; or sending, by the $i^{th}$ transmit end, the modified power gain factor $g'_i^{k}$ to the $i^{th}$ receive end, so that the $i^{th}$ receive end updates a physical layer parameter of the line between the $i^{th}$ transmit end and the $i^{th}$ receive end according to the modified power gain factor $g'_i^{k}$, and sends the updated physical layer parameter to the $i^{th}$ transmit end; and receiving the updated physical layer parameter sent by the $i^{th}$ receive end, and sending a physical layer parameter update response message to the $i^{th}$ receive end.

In an implementation manner of the present invention, after the new physical layer parameter between the $i^{th}$ transmit end and the $i^{th}$ receive end is negotiated, the method includes:

sending, by the $i^{th}$ transmit end, a power limit response message to the vectoring control entity.

In an optional implementation manner of the present invention, after that a vectoring control entity acquires a power control factor $D_{ii}^{k}$ of an $i^{th}$ transmit end on a $k^{th}$ subcarrier, the method includes:

sending, by the vectoring control entity, the power control factor $D_{ii}^{k}$ to the $i^{th}$ receive end, where the $i^{th}$ receive end is one transceiver, corresponding to the $i^{th}$ transmit end, of M transceivers located at a far end, so that if it is determined, according to the power control factor $D_{ii}^{k}$, that the power control factor $D_{ii}^{k}$ is less than a power gain factor $g_i^{k}$, of the current transmit signal of the $i^{th}$ transmit end, on the $k^{th}$ subcarrier, the $i^{th}$ receive end modifies the power gain factor $g_i^{k}$ of the current transmit signal, so that a modified power gain factor $g'_i^{k}$ is less than or equal to the power control factor $D_{ii}^{k}$, and sends the modified power gain factor $g'_i^{k}$ to the $i^{th}$ transmit end.

In an implementation manner of the present invention, after the $i^{th}$ receive end modifies the power gain factor $g_i^{k}$ of the current transmit signal of the $i^{th}$ transmit end, the $i^{th}$ transmit end and the $i^{th}$ receive end need to negotiate, according to the modified power gain factor $g'_i^{k}$, a new physical layer parameter of a line between the $i^{th}$ transmit end and the $i^{th}$ receive end, which specifically includes:

before the modified power gain factor $g'_i^{k}$ is sent to the $i^{th}$ transmit end, updating, by the $i^{th}$ receive end, a physical layer parameter of the line between the $i^{th}$ transmit end and the $i^{th}$ receive end according to the modified power gain factor $g'_i^{k}$; sending the updated physical layer parameter to the $i^{th}$ transmit end, where the updated physical layer parameter includes the modified power gain factor $g'_i^{k}$; receiving a physical layer parameter update response message sent by the $i^{th}$ transmit end; or after the modified power gain factor $g'_i^{k}$ is sent to the $i^{th}$ transmit end, receiving, by the $i^{th}$ receive end, an updated physical layer parameter sent by the $i^{th}$ transmit end, where the updated physical layer parameter is a physical layer parameter, of the line between the $i^{th}$ transmit end and the $i^{th}$ receive end, updated by the $i^{th}$ transmit end according to modified power gain factor $g'_i^{k}$; and returning a physical layer parameter update response message to the $i^{th}$ transmit end.

Because $D_{ii}^{k}$ calculated in the foregoing is the power control factor of the $i^{th}$ transmit end on the $k^{th}$ subcarrier, in this embodiment, a power control factor of each transmit end on each subcarrier is independent, and does not affect power control factors of other lines.

It should be noted that, in an actual application process, to avoid excessive message interactions between the vectoring control entity and a transmit end, the vectoring control entity generally sends, by using a message (for example, a power limit request message), after corresponding power control factors of each transmit end on all subcarriers are calculated, the corresponding power control factors of each transmit end on all the subcarriers to the transmit end or to a receive end corresponding to the transmit end.

It should be noted that, in this embodiment, after separately receiving a power limit response message sent by each transmit end, the vectoring control entity sends the foregoing acquired precoding matrix P to a precoder, so that the precoder performs precoding processing on a transmit signal of each transmit end.

Because each transmit end limits transmit power of a transmit signal according to a power control factor sent by the vectoring control entity, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

In this embodiment of the present invention, a vectoring control entity acquires a power control factor $D_{ii}^{k}$ of an $i^{th}$ transmit end on a $k^{th}$ subcarrier; and sends the power control factor $D_{ii}^{k}$ to the $i^{th}$ transmit end, so that if it is determined, according to the received power control factor $D_{ii}^{k}$, that the power control factor $D_{ii}^{k}$ is less than a power gain factor $g_i^{k}$, of a current transmit signal of the $i^{th}$ transmit end, on the $k^{th}$ subcarrier, the $i^{th}$ transmit end modifies the power gain factor $g_i^k$ of the current transmit signal, so that a modified power gain factor $g'_i^k$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 2:
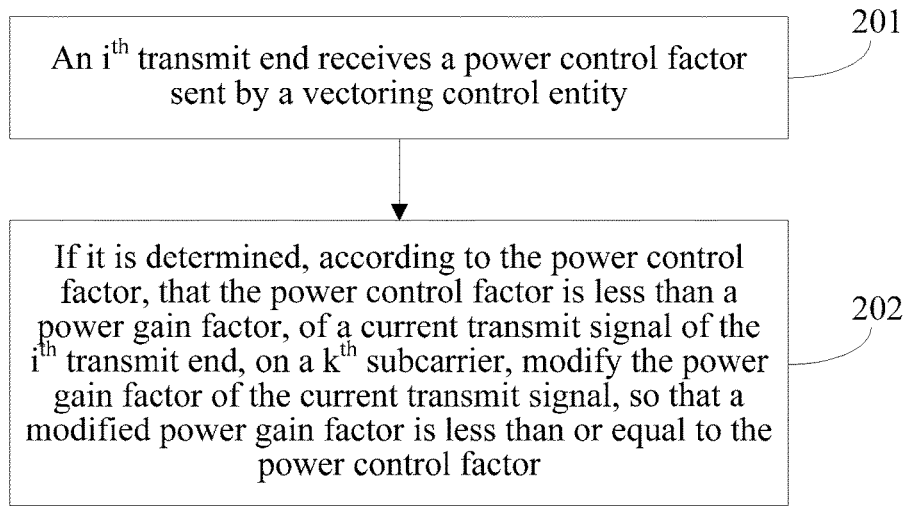
FIG. 2 is a schematic flowchart of a power control method according to another embodiment of the present invention.

FIG. 2 is a schematic flowchart of a power control method according to another embodiment of the present invention. As shown in FIG. 2, the power control method in this embodiment may include:

201. An $i^{th}$ transmit end receives a power control factor sent by a vectoring control entity.

The power control factor $D_{ii}^k$ sent by the vectoring control entity is a power control factor, acquired by the vectoring control entity, of the $i^{th}$ transmit end on a $k^{th}$ subcarrier, the $i^{th}$ transmit end is one transceiver of M transceivers located at a central office end, $1 \leq k \leq K$, and K indicates a quantity of subcarriers.

For a method of acquiring, by the vectoring control entity, the power control factor of the $i^{th}$ transmit end on the $k^{th}$ subcarrier, reference may be made to the related content in the embodiment shown in FIG. 1.

Specifically, the $i^{th}$ transmit end acquires the power control factor $D_{ii}^k$ by using a power limit request message sent by the vectoring control entity.

Because the power control factor $D_{ii}^k$ is the power control factor of the $i^{th}$ transmit end on the $k^{th}$ subcarrier, in this embodiment, a power control factor of each transmit end on each subcarrier is independent, and does not affect power control factors of other lines.

It should be noted that, in an actual application process, to avoid excessive message interactions between the vectoring control entity and a transmit end, the vectoring control entity generally sends by using a message (for example, a power limit request message), after corresponding power control factors of each transmit end on all subcarriers are calculated, the corresponding power control factors of each transmit end on all the subcarriers to the transmit end.

202. If it is determined, according to the power control factor, that the power control factor is less than a power gain factor, of a current transmit signal of the $i^{th}$ transmit end, on a $k^{th}$ subcarrier, modify the power gain factor of the current transmit signal, so that a modified power gain factor is less than or equal to the power control factor.

Specifically, the $i^{th}$ transmit end determines, according to the power control factor $D_{ii}^k$, whether the power control factor $D_{ii}^k$ is less than the power gain factor $g_i^k$, of the current transmit signal of the $i^{th}$ transmit end, on the $k^{th}$ subcarrier;

if it is determined that the power control factor $D_{ii}^k$ is less than the power gain factor $g_i^k$, of the current transmit signal of the $i^{th}$ transmit end, on the $k^{th}$ subcarrier, modify the power gain factor $g_i^k$ of the current transmit signal, so that the modified power gain factor $g'_i^k$ is less than or equal to the power control factor $D_{ii}^k$.

If it is determined that the power control factor $D_{ii}^k$ is greater than or equal to the power gain factor $g_i^k$, of the current transmit signal of the $i^{th}$ transmit end, on the $k^{th}$ subcarrier, the $i^{th}$ transmit end sends a power limit response message to the vectoring control entity.

In an implementation manner of the present invention, after the $i^{th}$ transmit end modifies the power gain factor $g_i^k$ of the current transmit signal, the $i^{th}$ transmit end and a corresponding receive end (an $i^{th}$ receive end) needs to negotiate, according to the modified power gain factor $g'_i^k$, a new physical layer parameter of a line between the $i^{th}$ transmit end and the $i^{th}$ receive end, which specifically includes:

updating, by the $i^{th}$ transmit end, a physical layer parameter of the line between the $i^{th}$ transmit end and the $i^{th}$ receive end according to the modified power gain factor $g'_i^k$; and sending the updated physical layer parameter to the $i^{th}$ receive end, so that the $i^{th}$ receive end accepts the updated physical layer parameter, and returns a physical layer parameter update response message to the $i^{th}$ transmit end; or sending, by the $i^{th}$ transmit end, the modified power gain factor $g'_i^k$ to the $i^{th}$ receive end, so that the $i^{th}$ receive end updates a physical layer parameter of the line between the $i^{th}$ transmit end and the $i^{th}$ receive end according to the modified power gain factor $g'_i^k$, and sends the updated physical layer parameter to the $i^{th}$ transmit end; and receiving the updated physical layer parameter sent by the $i^{th}$ receive end, and sending a physical layer parameter update response message to the $i^{th}$ receive end.

In an implementation manner of the present invention, after the new physical layer parameter between the $i^{th}$ transmit end and the $i^{th}$ receive end is negotiated, the method includes:

sending, by the $i^{th}$ transmit end, a power limit response message to the vectoring control entity.

Accordingly, after receiving a power limit response message sent by each transmit end, the vectoring control entity sends the foregoing acquired precoding matrix P to a precoder, so that the precoder performs precoding processing on a transmit signal of each transmit end by using the precoding matrix P.

In this embodiment of the present invention, a vectoring control entity acquires a power control factor $D_{ii}^k$ of an $i^{th}$ transmit end on a $k^{th}$ subcarrier; and sends the power control factor $D_{ii}^k$ to the $i^{th}$ transmit end, so that if it is determined, according to the received power control factor $D_{ii}^k$, that the power control factor $D_{ii}^k$ is less than a power gain factor $g_i^k$, of a current transmit signal of the $i^{th}$ transmit end, on the $k^{th}$ subcarrier, the $i^{th}$ transmit end modifies the power gain factor $g_i^k$ of the current transmit signal, so that a modified power gain factor $g'_i^k$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 3:
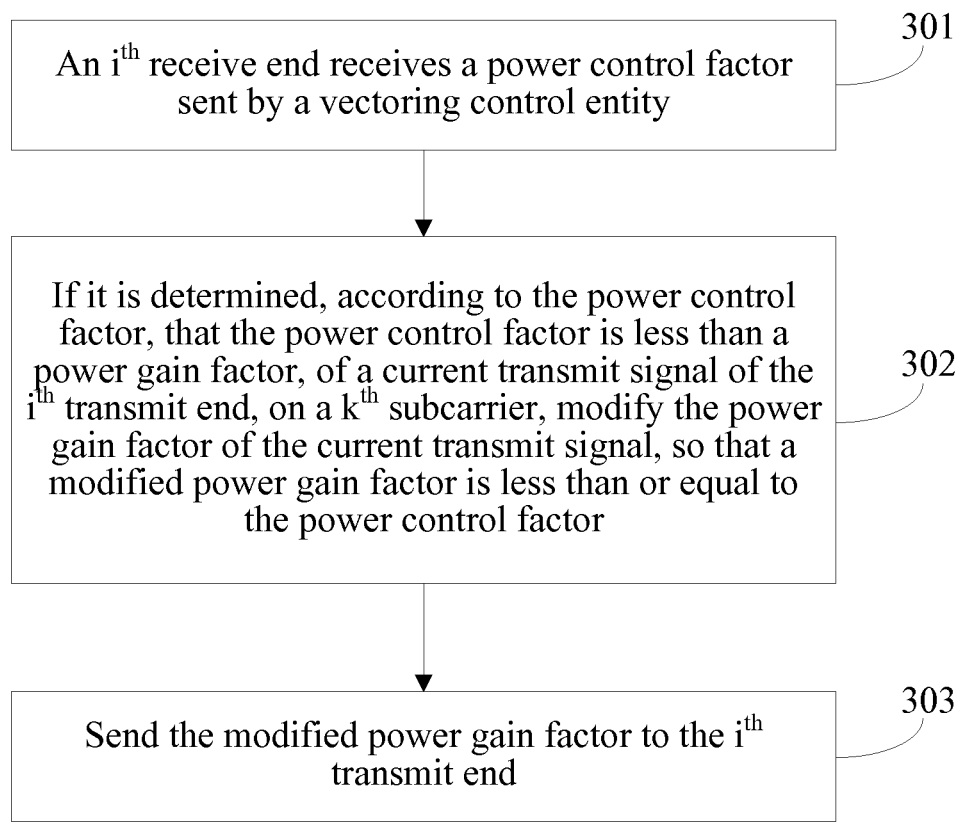
FIG. 3 is a schematic flowchart of a power control method according to another embodiment of the present invention.

FIG. 3 is a schematic flowchart of a power control method according to another embodiment of the present invention. As shown in FIG. 3, the power control method in this embodiment may include:

301. An $i^{th}$ receive end receives a power control factor sent by a vectoring control entity.

The power control factor $D_{ii}^{k}$ sent by the vectoring control entity is a power control factor, acquired by the vectoring control entity, of an $i^{th}$ transmit end on a $k^{th}$ subcarrier, where the $i^{th}$ transmit end is one transceiver of M transceivers located at a central office end, $1 \leq k \leq K$, K indicates a quantity of subcarriers, and the $i^{th}$ receive end is one transceiver, corresponding to the $i^{th}$ transmit end, of M transceivers located at a far end.

For a method of acquiring, by the vectoring control entity, the power control factor of the $i^{th}$ transmit end on the $k^{th}$ subcarrier, reference may be made to the related content in the embodiment shown in FIG. 1.

Specifically, the $i^{th}$ receive end acquires the power control factor $D_{ii}^{k}$ by using a power limit request message sent by the vectoring control entity.

Because the power control factor $D_{ii}^{k}$ is the power control factor of the $i^{th}$ transmit end on the $k^{th}$ subcarrier, in this embodiment, a power control factor of each transmit end on each subcarrier is independent, and does not affect power control factors of other lines.

It should be noted that, in an actual application process, to avoid excessive message interactions between the vectoring control entity and a receive end, the vectoring control entity generally sends, by using a message (for example, a power limit request message), after corresponding power control factors of each transmit end on all subcarriers are calculated, the corresponding power control factors of each transmit end on all the subcarriers to a corresponding receive end.

302. If it is determined, according to the power control factor, that the power control factor is less than a power gain factor, of a current transmit signal of the $i^{th}$ transmit end, on a $k^{th}$ subcarrier, modify the power gain factor of the current transmit signal, so that a modified power gain factor is less than or equal to the power control factor.

Specifically, if it is determined, according to the power control factor $D_{ii}^{k}$, that the power control factor $D_{ii}^{k}$ is less than the power gain factor $g_i^{k}$, of the current transmit signal of the $i^{th}$ transmit end, on the $k^{th}$ subcarrier, the $i^{th}$ receive end modifies the power gain factor $g_i^{k}$ of the current transmit signal, so that the modified power gain factor $g'_i^{k}$ is less than or equal to the power control factor $D_{ii}^{k}$.

303. Send the modified power gain factor to the $i^{th}$ transmit end.

In an implementation manner of the present invention, after the $i^{th}$ receive end modifies the power gain factor $g_i^{k}$ of the current transmit signal of the $i^{th}$ transmit end, the $i^{th}$ receive end and a corresponding transmit end (an $i^{th}$ transmit end) need to negotiate a new physical layer parameter of a line between the $i^{th}$ transmit end and the $i^{th}$ receive end, which specifically includes:

updating, by the $i^{th}$ receive end, a physical layer parameter of the line between the $i^{th}$ transmit end and the $i^{th}$ receive end according to the modified power gain factor $g'_i^{k}$; sending the updated physical layer parameter to the $i^{th}$ transmit end, where the updated physical layer parameter includes the modified power gain factor $g'_i^{k}$; and receiving a physical layer parameter update response message sent by the $i^{th}$ receive end; or after the modified power gain factor is sent to the $i^{th}$ transmit end, receiving, by the $i^{th}$ receive end, an updated physical layer parameter sent by the $i^{th}$ transmit end, where the updated physical layer parameter is a physical layer parameter, of the line between the $i^{th}$ transmit end and the $i^{th}$ receive end, updated by the $i^{th}$ transmit end according to the modified power gain factor $g_i^{k}$; and returning, by the $i^{th}$ receive end, a physical layer parameter update response message to the $i^{th}$ transmit end.

It should be noted that, after the new physical layer parameter between the $i^{th}$ transmit end and the $i^{th}$ receive end is negotiated, the $i^{th}$ transmit end sends a power limit response message to the vectoring control entity.

Accordingly, after receiving a power limit response message sent by each transmit end, the vectoring control entity sends the foregoing acquired precoding matrix P to a precoder, so that the precoder performs precoding processing on a transmit signal of each transmit end by using the precoding matrix P.

In this embodiment of the present invention, an $i^{th}$ receive end receives a power control factor $D_{ii}^{k}$, acquired by a vectoring control entity, of an $i^{th}$ transmit end on a $k^{th}$ subcarrier; and if it is determined, according to the power control factor $D_{ii}^{k}$, that the power control factor $D_{ii}^{k}$ is less than a power gain factor $g_i^{k}$, of a current transmit signal of the $i^{th}$ transmit end, on the $k^{th}$ subcarrier, modifies the power gain factor $g_i^{k}$ of the current transmit signal of the $i^{th}$ transmit end, so that a modified power gain factor $g'_i^{k}$ is less than or equal to the power control factor $D_{ii}^{k}$, and sends the modified power gain factor $g'_i^{k}$ to the $i^{th}$ transmit end. Because a power control factor $D_{ii}^{k}$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 4:
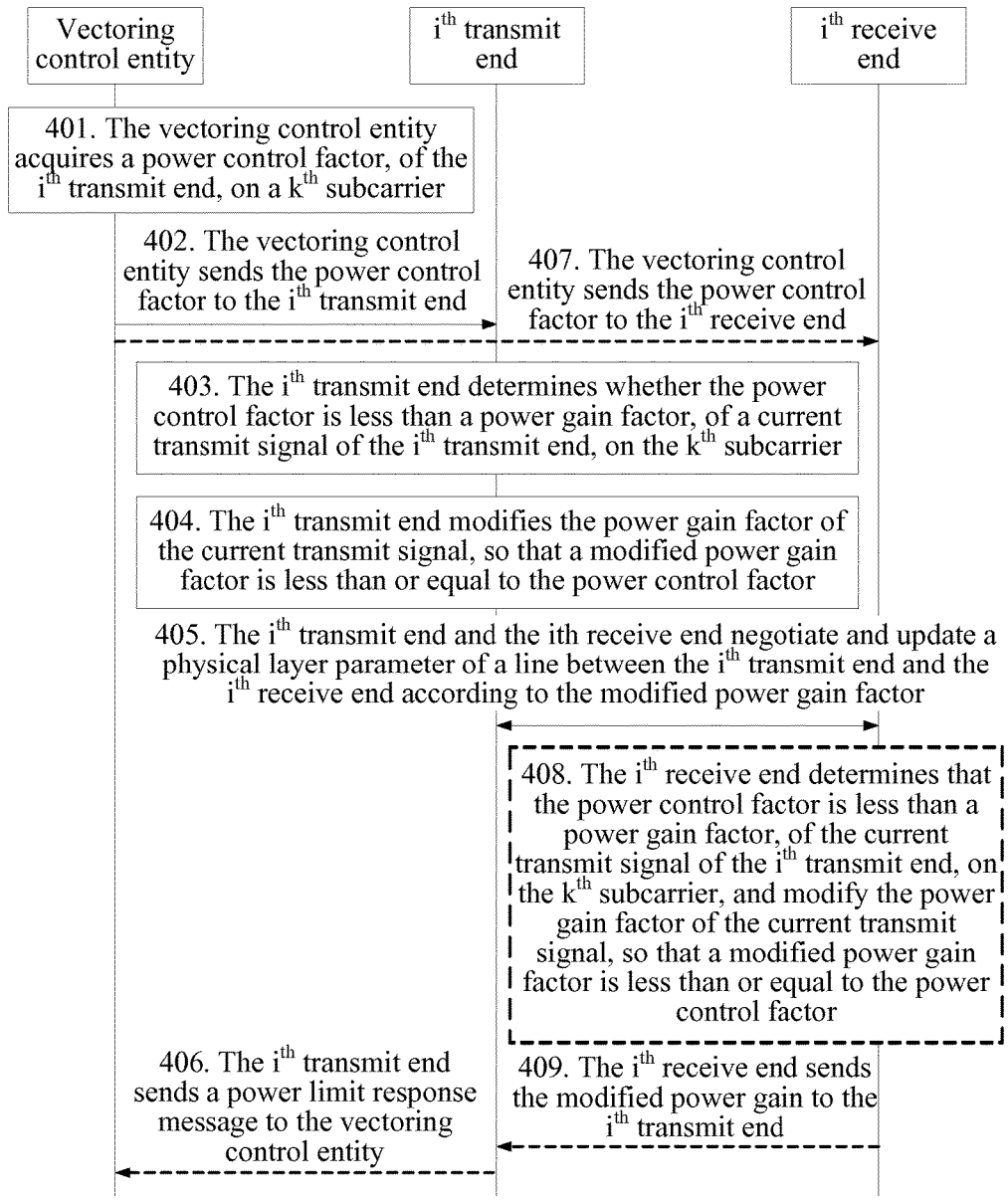
FIG. 4 is a signaling diagram of a power control method according to another embodiment of the present invention.

FIG. 4 is a signaling diagram of a power control method according to another embodiment of the present invention. As shown in FIG. 4, the power control method in this embodiment may include:

401. A vectoring control entity acquires a power control factor of an $i^{th}$ transmit end on a $k^{th}$ subcarrier.

During specific implementation, reference may be made to the related content in step 101 in the embodiment shown in FIG. 1.

402. The vectoring control entity sends the power control factor to the $i^{th}$ transmit end.

Specifically, the vectoring control entity sends the power control factor $D_{ii}^{k}$ to the $i^{th}$ transmit end by using a power limit request message.

403. The $i^{th}$ transmit end determines whether the power control factor is less than a power gain factor, of a current transmit signal of the $i^{th}$ transmit end, on the $k^{th}$ subcarrier.

After the $i^{th}$ transmit end receives the power control factor $D_{ii}^{k}$ sent by the vectoring control entity in step 402, if it is determined that the power control factor $D_{ii}^{k}$ is less than the power gain factor $g_{i}^{k}$, of the current transmit signal of the $i^{th}$ transmit end, on the $k^{th}$ subcarrier, step 404 is executed; otherwise, step 406 is executed.

404. The $i^{th}$ transmit end modifies the power gain factor of the current transmit signal, so that a modified power gain factor is less than or equal to the power control factor.

405. The $i^{th}$ transmit end and an $i^{th}$ receive end negotiate and update a physical layer parameter of a line between the $i^{th}$ transmit end and the $i^{th}$ receive end according to the modified power gain factor.

During Specific Implementation:

In a first implementation manner, the $i^{th}$ transmit end updates the physical layer parameter of the line between the $i^{th}$ transmit end and the $i^{th}$ receive end according to the modified power gain factor $g'^{k}_{i}$; and sends the updated physical layer parameter to the $i^{th}$ receive end, so that the $i^{th}$ receive end accepts the updated physical layer parameter, and returns a physical layer parameter update response message to the $i^{th}$ transmit end.

It should be noted that, the $i^{th}$ transmit end needs to notify, by using inversion of the synchronization frame bits in a synchronization symbol, the $i^{th}$ receive end of an application time point related to the updated physical layer parameter.

As for that the $i^{th}$ transmit end updates the physical layer parameter of the line between the $i^{th}$ transmit end and the $i^{th}$ receive end according to the modified power gain factor $g'_{i}$, during specific implementation, for example, the $i^{th}$ transmit end uses the modified power gain factor $g'^{k}_{i}$ to update a signal-to-noise ratio parameter (SNR for short), that is, $$SNR_{i}^{'k} = SNR_{i}^{k} \times g_{i}^{'k}/g_{i}^{k}.$$

$SNR_{i}^{'k}$ is an updated signal-to-noise ratio, and $SNR_{i}^{k}$ is a current signal-to-noise ratio.

New bit loading may be obtained according to the new $SNR_{i}^{'k}$, and a quantity of bits carried by the $k^{th}$ subcarrier is calculated: quantity of bits=round(log 2(1+$SNR_{i}^{'k}$/Margin)).

After new bit loading is obtained, a total quantity of bits and an activation rate of each orthogonal frequency division multiplexing technology (OFDM for short) symbol may be updated, and a framing parameter is updated. The framing parameter includes a quantity of bits (bit) of a data transmission unit.

Because bit allocation relates to a rounding operation, after rounding, it is required to update $SNR_{i}^{'k}$ based on an integral number; the power gain factor $g_{i}^{k}$ is tuned according to a formula bit=log 2(1+$SNR_{i}^{'k}$/Margin), so that when the quantity of bits is an integral number, a corresponding power gain factor is the modified power gain factor $g'^{k}_{i}$.

For that the $i^{th}$ transmit end calculates the physical layer parameter of the line between the $i^{th}$ transmit end and the $i^{th}$ receive end according to the modified power gain factor $g'^{k}_{i}$, specifically, reference may be made to related specifications in a vectoring crosstalk cancellation (VECTOR) G993.5 system, and which is not described again. The physical layer parameter includes but is not limited to a power gain factor of a subcarrier, a signal-to-noise ratio of a subcarrier, bit allocation of a subcarrier, and an FEQ coefficient or a bearer parameter of a subcarrier.

In a second implementation manner, the $i^{th}$ transmit end sends the modified power gain factor $g'^{k}_{i}$ to the $i^{th}$ receive end, so that the $i^{th}$ receive end updates the physical layer parameter of the line between the $i^{th}$ transmit end and the $i^{th}$ receive end according to the modified power gain factor $g'^{k}_{i}$, and sends the updated physical layer parameter to the $i^{th}$ transmit end; and the $i^{th}$ transmit end receives the updated physical layer parameter sent by the $i^{th}$ receive end, and sends a physical layer parameter update response message to the $i^{th}$ receive end.

It should be noted that, the $i^{th}$ receive end needs to notify, by using inversion of the synchronization frame bits in a synchronization symbol, the $i^{th}$ transmit end of an application time point related to the updated physical layer parameter.

As for that the $i^{th}$ receive end updates the physical layer parameter of the line between the $i^{th}$ transmit end and the $i^{th}$ receive end according to the modified power gain factor $g'^{k}_{i}$, reference may be made to the foregoing implementation process in which the $i^{th}$ transmit end updates the physical layer parameter of the line between the $i^{th}$ transmit end and the $i^{th}$ receive end according to the modified power gain factor $g'^{k}_{i}$, which is not described again.

406. The $i^{th}$ transmit end sends a power limit response message to the vectoring control entity.

Optionally, after step 401, the method may further include step 407.

407. The vectoring control entity sends the power control factor to the $i^{th}$ receive end.

The $i^{th}$ receive end is a receive end corresponding to the $i^{th}$ transmit end.

408. The $i^{th}$ receive end determines that the power control factor is less than a power gain factor, of the current transmit signal of the $i^{th}$ transmit end, on the $k^{th}$ subcarrier, and modifies the power gain factor of the current transmit signal, so that a modified power gain factor is less than or equal to the power control factor.

409. The $i^{th}$ receive end sends the modified power gain factor to the $i^{th}$ transmit end.

In an implementation manner of the present invention, after the $i^{th}$ receive end modifies the power gain factor $g_{i}^{k}$ of the current transmit signal of the $i^{th}$ transmit end, the $i^{th}$ receive end and a corresponding transmit end (an $i^{th}$ receive transmit end) need to negotiate a new physical layer parameter of the line between the $i^{th}$ transmit end and the $i^{th}$ receive end, which specifically includes:

updating, by the $i^{th}$ receive end, a physical layer parameter of the line between the $i^{th}$ transmit end and the $i^{th}$ receive end according to the modified power gain factor $g_{i}^{k}$ sending the updated physical layer parameter to the $i^{th}$ transmit end, where the updated physical layer parameter includes the modified power gain factor $g'^{k}_{i}$; and receiving a physical layer parameter update response message sent by the $i^{th}$ transmit end; or after the modified power gain factor is sent to the $i^{th}$ transmit end, receiving, by the $i^{th}$ receive end, an updated physical layer parameter sent by the $i^{th}$ transmit end, where the updated physical layer parameter is a physical layer parameter, of the line between the $i^{th}$ transmit end and the $i^{th}$ receive end, updated by the $i^{th}$ transmit end according to the modified power gain factor $g'^{k}_{i}$; and returning, by the $i^{th}$ receive end, a physical layer parameter update response message to the $i^{th}$ transmit end.

Then, the procedure returns to step 406, that is, the $i^{th}$ transmit end sends a power limit response message to the vectoring control entity.

It should be noted that, to reduce signaling interactions, based on separately receiving a power limit response message sent by each transmit end, the vectoring control entity sends the precoding matrix to a precoder, and the precoder performs precoding processing on a transmit signal of each transmit end by using the precoding matrix P.

In this embodiment of the present invention, a vectoring control entity acquires a power control factor $D_{ii}^{k}$ of an $i^{th}$ transmit end on a $k^{th}$ subcarrier; and sends the power control factor $D_{ii}^{k}$ to the $i^{th}$ transmit end or an $i^{th}$ receive end, so that if it is determined, according to the received power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end or the $i^{th}$ receive end modifies the power gain factor $g_{i}^{k}$ of the current transmit signal, so that a modified power gain factor $g'_{i}^{k}$ is less than or equal to the power control factor $D_{ii}^{k}$. Because a power control factor $D_{ii}^{k}$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 5:
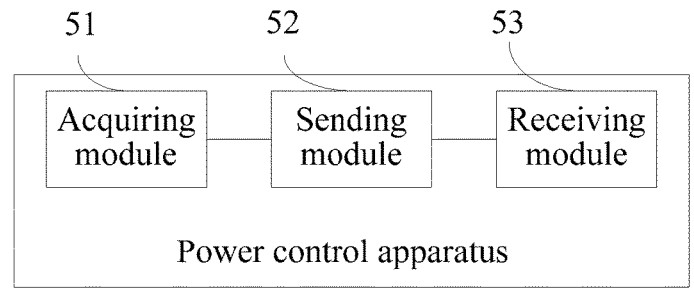
FIG. 5 is a schematic structural diagram of a power control apparatus according to another embodiment of the present invention.

FIG. 5 is a schematic structural diagram of a power control apparatus according to another embodiment of the present invention. The power control apparatus is located at a vectoring control entity, applied in a vectoring crosstalk cancellation system, and as shown in FIG. 5, includes:

an acquiring module 51, configured to acquire a power control factor $D_{ii}^{k}$ of an $i^{th}$ transmit end on a $k^{th}$ subcarrier, where the $i^{th}$ transmit end is one transceiver of M transceivers located at a central office end, $1 \le k \le K$, and K indicates a quantity of subcarriers; and a sending module 52, configured to send, to the $i^{th}$ transmit end, the power control factor $D_{ii}^{k}$ acquired by the acquiring module, so that if it is determined, according to the power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'_{i}^{k}$ is less than or equal to the power control factor $D_{ii}^{k}$.

For example, after the acquiring module acquires the power control factor $D_{ii}^{k}$ of the $i^{th}$ transmit end on the $k^{th}$ subcarrier, the sending module 52 is further configured to: send the power control factor $D_{ii}^{k}$ to an $i^{th}$ receive end, where the $i^{th}$ receive end is one transceiver, corresponding to the $i^{th}$ transmit end, of M transceivers located at a far end, so that if it is determined, according to the power control factor $D_{ii}^{k}$, that the power control factor $D_{ii}^{k}$ is less than a power gain factor $g_{i}^{k}$, of the current transmit signal of the $i^{th}$ transmit end, on the $k^{th}$ subcarrier, the $i^{th}$ receive end modifies the power gain factor $g_{i}^{k}$ of the current transmit signal, so that a modified power gain factor $g'_{i}^{k}$ is less than or equal to the power control factor $D_{ii}^{k}$; and sends the modified power gain factor $g'_{i}^{k}$ to the $i^{th}$ transmit end.

For example, the acquiring module 51 is specifically configured to:

acquire a precoding matrix $P^{k}$ on the $k^{th}$ subcarrier; and calculate the power control factor $D_{ii}^{k}$ of the $i^{th}$ transmit end on the $k^{th}$ subcarrier by using an $i^{th}$ row vector and an $i^{th}$ column vector of the matrix $P^{k}$.

For example, the apparatus further includes:

a receiving module 53, configured to receive a power limit response message sent by the $i^{th}$ transmit end.

It should be noted that, to reduce signaling interactions, based on that the receiving module 53 separately receives a power limit response message sent by each transmit end, the sending module 52 sends the precoding matrix to a precoder, so that the precoder performs precoding processing on a transmit signal of each transmit end by using the precoding matrix P.

In this embodiment of the present invention, a vectoring control entity acquires a power control factor $D_{ii}^{k}$ of an $i^{th}$ transmit end on a $k^{th}$ subcarrier; and sends the power control factor $D_{ii}^{k}$ to the $i^{th}$ transmit end, so that if it is determined, according to the received power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'_{i}^{k}$ is less than or equal to the power control factor $D_{ii}^{k}$. Because a power control factor $D_{ii}^{k}$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 6:
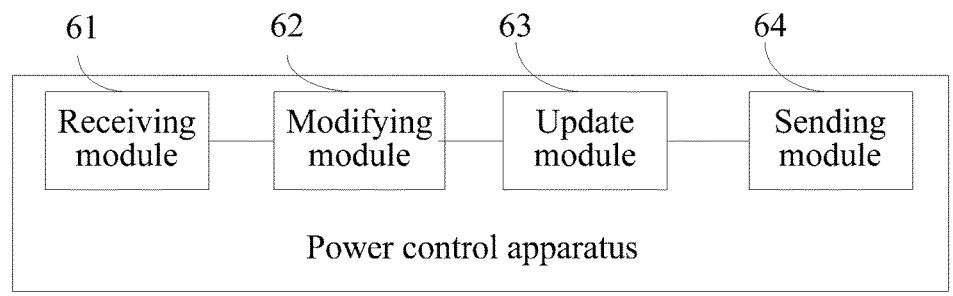
FIG. 6 is a schematic structural diagram of a power control apparatus according to another embodiment of the present invention.

FIG. 6 is a schematic structural diagram of a power control apparatus according to another embodiment of the present invention. The power control apparatus is applied in a vectoring crosstalk cancellation system, and is located at a transmit end. The transmit end is one transceiver of M transceivers located at a central office end. As shown in FIG. 6, the power control apparatus includes:

a receiving module 61, configured to receive a power control factor $D_{ii}^{k}$ sent by a vectoring control entity, where the power control factor $D_{ii}^{k}$ is a power control factor, acquired by the vectoring control entity, of the transmit end on a $k^{th}$ subcarrier, $1 \leq i \leq M$, i indicates a serial number of the transmit end, $1 \leq k \leq K$, and K indicates a quantity of subcarriers; and a modifying module 62, configured to: if it is determined, according to the power control factor $D_{ii}^k$, that the power control factor $D_{ii}^k$ is less than a power gain factor $g_i^k$ of a current transmit signal of the transmit end, on the $k^{th}$ subcarrier, modify the power gain factor $g_i^k$ of the current transmit signal, so that a modified power gain factor $g'_i^k$ is less than or equal to the power control factor $D_{ii}^k$.

For example, after the modifying module 62 modifies the power gain factor $g_i^k$ of the current transmit signal; the apparatus further includes:

an update module 63, configured to update a physical layer parameter of a line between the transmit end and a corresponding receive end according to the power gain factor $g'_i^k$ modified by the modifying module 62, where the corresponding receive end is one transceiver, corresponding to the transmit end, of M transceivers located at a far end; and a sending module 64, configured to send, to the corresponding receive end, the physical layer parameter updated by the update module 63, so that the corresponding receive end accepts the updated physical layer parameter, and returns a physical layer parameter update response message to the transmit end.

For example, after the modifying module modifies the power gain factor $g_i^k$ of the current transmit signal, the sending module 64 is further configured to send the modified power gain factor $g'_i^k$ to the corresponding receive end, so that the corresponding receive end updates a physical layer parameter of a line between the corresponding receive end and the transmit end according to the modified power gain factor $g'_i^k$, and sends the updated physical layer parameter to the transmit end; and the receiving module 61 is further configured to receive the updated physical layer parameter sent by the corresponding receive end, so that the sending module sends a physical layer parameter update response message to the corresponding receive end.

For example, after the modifying module modifies the power gain factor $g_i^k$ of the current transmit signal, the sending module 64 is further configured to send a power limit response message to the vectoring control entity.

Accordingly, to reduce signaling interactions, based on separately receiving a power limit response message sent by each transmit end, the vectoring control entity sends the precoding matrix to a precoder, so that the precoder performs precoding processing on a transmit signal of each transmit end by using the precoding matrix P.

In this embodiment of the present invention, a transmit end receives a power control factor $D_{ii}^k$, acquired by a vectoring control entity, of the transmit end on a $k^{th}$ subcarrier; and if it is determined, according to the received power control factor $D_{ii}^k$, that the power control factor $D_{ii}^k$ is less than a power gain factor $g_i^k$, of a current transmit signal of the transmit end, on the $k^{th}$ subcarrier, modifies the power gain factor $g_i^k$ of the current transmit signal, so that a modified power gain factor $g'_i^k$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 7:
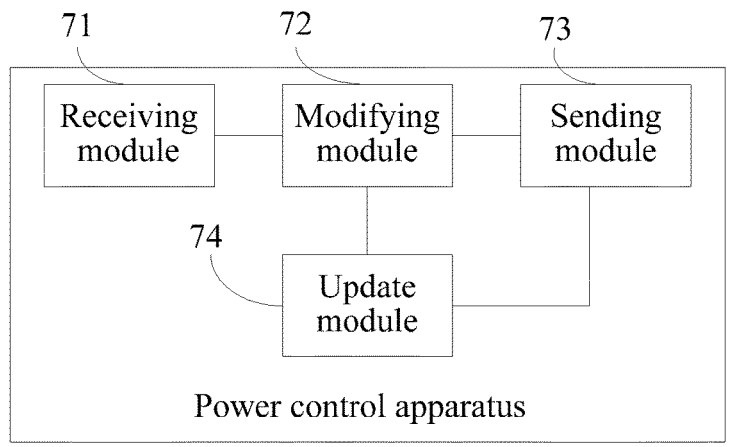
FIG. 7 is a schematic structural diagram of a power control apparatus according to another embodiment of the present invention.

FIG. 7 is a schematic structural diagram of a power control apparatus according to another embodiment of the present invention. The power control apparatus is applied in a vectoring crosstalk cancellation system, and is located at a receive end. The receive end is one transceiver of M transceivers located at a far end. As shown in FIG. 7, the apparatus includes:

a receiving module 71, configured to receive a power control factor $D_{ii}^k$ sent by a vectoring control entity, where the power control factor $D_{ii}^k$ is a power control factor, acquired by the vectoring control entity, of an $i^{th}$ transmit end on a $k^{th}$ subcarrier, the $i^{th}$ transmit end is one transceiver, corresponding to the receive end, of M transceivers located at a central office end, $1 \leq k \leq K$, and K indicates a quantity of subcarriers;

a modifying module 72, configured to: if it is determined, according to the power control factor $D_{ii}^k$, that the power control factor $D_{ii}^k$ is less than a power gain factor $g_i^k$ of a current transmit signal of the $i^{th}$ transmit end, on the $k^{th}$ subcarrier, modify the power gain factor $g_i^k$ of the current transmit signal, so that a modified power gain factor $g'_i^k$ is less than or equal to the power control factor $D_{ii}^k$; and a sending module 73, configured to send the modified power gain factor $g'_i^k$ to the $i^{th}$ transmit end.

For example, before the sending module 73 sends the modified power gain factor $g'_i^k$ to the $i^{th}$ transmit end, the apparatus further includes:

an update module 74, configured to, update a physical layer parameter of a line between the $i^{th}$ transmit end and an $i^{th}$ receive end according to the modified power gain factor $g'_i^k$; where the sending module 73 is further configured to send the updated physical layer parameter to the $i^{th}$ transmit end, where the updated physical layer parameter includes the modified power gain factor $g'_i^k$; and the receiving module 71 is further configured to receive a physical layer parameter update response message sent by the $i^{th}$ transmit end.

For example, after the sending module 73 sends the modified power gain factor $g'_i^k$ to the $i^{th}$ transmit end, the receiving module 71 is further configured to receive an updated physical layer parameter sent by the $i^{th}$ transmit end, where the updated physical layer parameter is a physical layer parameter, of the line between the $i^{th}$ transmit end and the receive end, updated by the $i^{th}$ transmit end according to the modified power gain factor $g'_i^k$; and the sending module 73 is further configured to return a physical layer parameter update response message to the $i^{th}$ transmit end.

It should be noted that, after the receive end and a transmit end (the $i^{th}$ transmit end) corresponding to the receive end negotiate a new physical layer parameter, the $i^{th}$ transmit end sends a power limit response message to the vectoring control entity.

Accordingly, after receiving a power limit response message sent by each transmit end, the vectoring control entity sends the foregoing acquired precoding matrix P to a precoder, so that the precoder performs precoding processing on a transmit signal of each transmit end by using the precoding matrix P.

In this embodiment of the present invention, a receive end receives a power control factor $D_{ii}^{k}$, acquired by a vectoring control entity, of an $i^{th}$ transmit end on a $k^{th}$ subcarrier; and if it is determined, according to the received power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, modifies the power gain factor $g_{i}^{k}$ of the current transmit signal, so that a modified power gain factor $g'_{i}^{k}$ is less than or equal to the power control factor $D_{ii}^{k}$, and sends the modified power gain factor $g_{i}^{k}$ to the $i^{th}$ transmit end. Because a power control factor $D_{ii}^{k}$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 8:
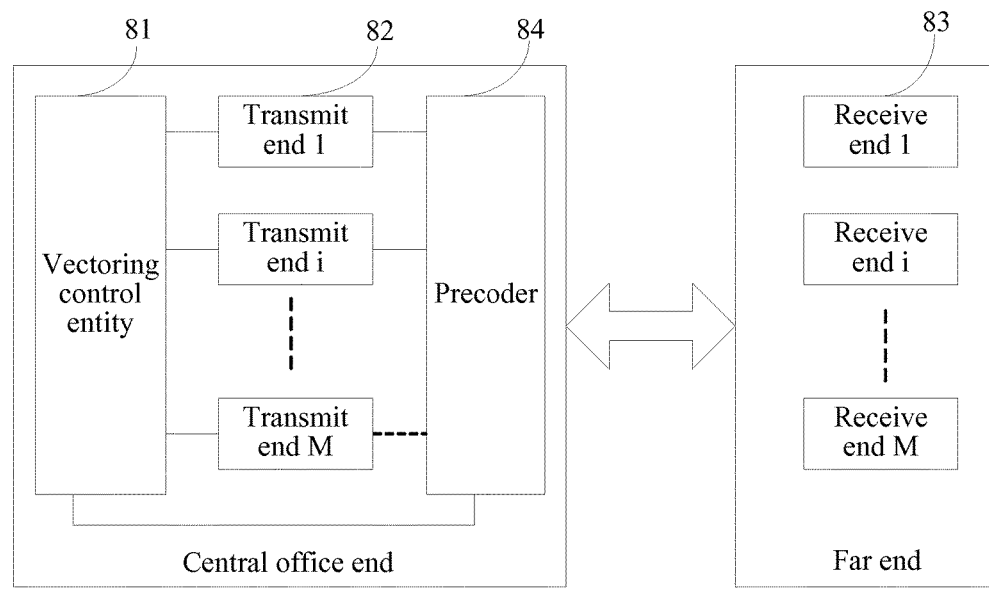
FIG. 8 is a schematic structural diagram of a power control system according to another embodiment of the present invention.

FIG. 8 is a schematic structural diagram of a power control system according to another embodiment of the present invention. The power control system is applied in a vectoring crosstalk cancellation system, and as shown in FIG. 8, includes a vectoring control entity 81, M transmit ends 82, and M receive ends 83.

The M transmit ends are M transceivers located at a central office end, the M receive ends are M transceivers located at a far end, and the M transmit ends are corresponding, in a one-to-one manner, to the M receive ends.

The vectoring control entity 81 includes the power control apparatus in the embodiment shown in FIG. 5, and the details are not described again;

any transmit end of the M transmit ends 82 includes the power control apparatus in the embodiment shown in FIG. 6, and details are not described again; and any receive end of the M receive ends 83 includes the power control apparatus in the embodiment shown in FIG. 6, and details are not described again.

Further, the system further includes a precoder 84, located at the central office end, separately connected to the vectoring control entity 81 and the M transmit ends 82, and configured to: receive a precoding matrix sent by the vectoring control entity 81, and perform precoding on transmit signals of the M transmit ends by using the precoding matrix.

Figure 9:
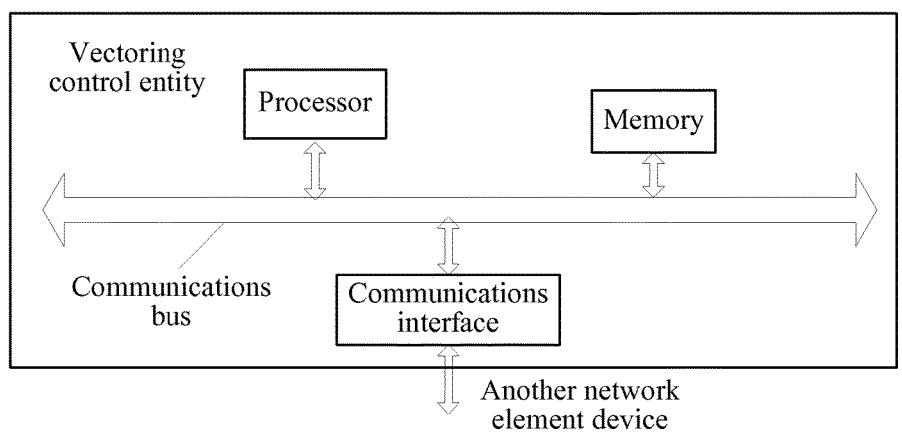
FIG. 9 is a schematic structural diagram of a vectoring control entity according to another embodiment of the present invention.

FIG. 9 is a schematic structural diagram of a vectoring control entity according to another embodiment of the present invention. The vectoring control entity is applied in a vectoring crosstalk cancellation system, and as shown in FIG. 9, includes a processor, a memory, and a communications bus, where the memory stores an instruction for implementing a power control method, and the processor is connected to the memory through the communications bus. Further, the vectoring control entity further includes a communications bus, so as to establish a communications connection with another network element device (for example, a transmit end) by using the communications bus.

When the processor invokes the instruction in the memory, the following steps are executed:

acquiring a power control factor $D_{ii}^{k}$ of an $i^{th}$ transmit end on a $k^{th}$ subcarrier, where the $i^{th}$ transmit end is one transceiver of M transceivers located at a central office end, $1 \leq k \leq K$, and K indicates a quantity of subcarriers; and sending the power control factor $D_{ii}^{k}$ to the $i^{th}$ transmit end, so that if it is determined, according to the power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'_{i}^{k}$ is less than or equal to the power control factor $D_{ii}^{k}$.

For example, after the acquiring a power control factor $D_{ii}^{k}$ of an $i^{th}$ transmit end on a $k^{th}$ subcarrier, the steps further include:

sending the power control factor $D_{ii}^{k}$ to an $i^{th}$ receive end, where the $i^{th}$ receive end is one transceiver, corresponding to the $i^{th}$ transmit end, of M transceivers located at a far end, so that if it is determined, according to the power control factor $D_{ii}^{k}$, that the power control factor $D_{ii}^{k}$ is less than a power gain factor $g_{i}^{k}$, of the current transmit signal of the $i^{th}$ transmit end, on the $k^{th}$ subcarrier, the $i^{th}$ receive end modifies the power gain factor $g_{i}^{k}$ of the current transmit signal, so that a modified power gain factor $g'_{i}^{k}$ is less than or equal to the power control factor $D_{ii}^{k}$, and sends the modified power gain factor $g'_{i}^{k}$ to the $i^{th}$ transmit end.

For example, the acquiring a power control factor $D_{ii}^{k}$ of an $i^{th}$ transmit end on a $k^{th}$ subcarrier includes:

acquiring a precoding matrix $P^{k}$ on the $k^{th}$ subcarrier; and calculating the power control factor $D_{ii}^{k}$ of the $i^{th}$ transmit end on the $k^{th}$ subcarrier by using an $i^{th}$ row vector and an $i^{th}$ column vector of the matrix $P^{k}$.

For example, after the sending the power control factor $D_{ii}^{k}$ to the $i^{th}$ transmit end, or after the sending, by the vectoring control entity, the power control factor $D_{ii}^{k}$ to an $i^{th}$ receive end, the steps include:

receiving a power limit response message sent by the $i^{th}$ transmit end.

It should be noted that, in this embodiment, after separately receiving a power limit response message sent by each transmit end, the vectoring control entity sends the foregoing acquired precoding matrix P to a precoder, so that the precoder performs precoding processing on a transmit signal of each transmit end.

In this embodiment of the present invention, a vectoring control entity acquires a power control factor $D_{ii}^{k}$ of an $i^{th}$ transmit end on a $k^{th}$ subcarrier; and sends the power control factor $D_{ii}^{k}$ to the $i^{th}$ transmit end, so that if it is determined, according to the received power control factor $D_{ii}^{k}$, that the power control factor $D_{ii}^{k}$ is less than a power gain factor $g_{i}^{k}$, of a current transmit signal of the $i^{th}$ transmit end, on the $k^{th}$ subcarrier, the $i^{th}$ transmit end modifies the power gain factor $g_{i}^{k}$ of the current transmit signal, so that a modified power gain factor $g'^k_i$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 10:
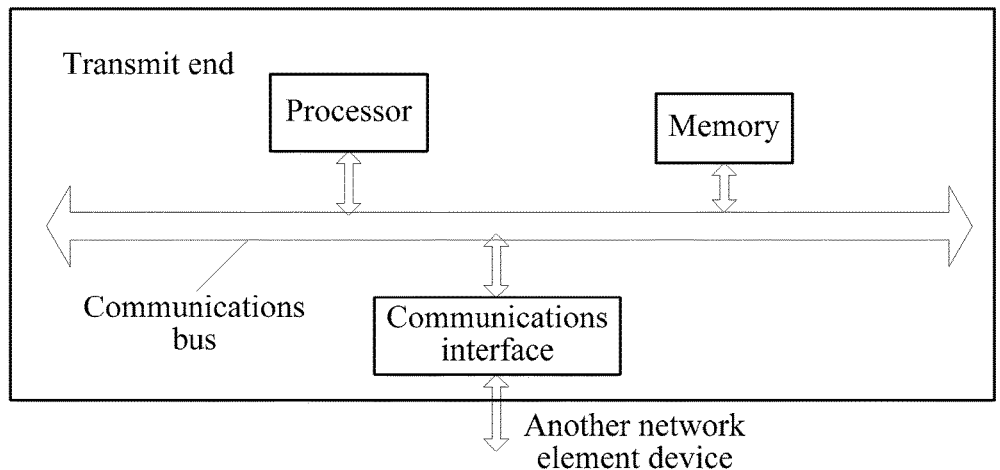
FIG. 10 is a schematic structural diagram of a transmit end according to another embodiment of the present invention.

FIG. 10 is a schematic structural diagram of a transmit end according to another embodiment of the present invention. The transmit end is applied in a vectoring crosstalk cancellation system. The transmit end is one transceiver of M transceivers located at a central office end. As shown in FIG. 10, the transmit end includes a processor, a memory, and a communications bus, where the memory stores an instruction for implementing a power control method, and the processor is connected to the memory through the communications bus. Furthermore, the transmit end further includes a communications interface, so as to establish a communications connection with another network element device (for example, a vectoring control entity) by using the communications interface.

When the processor invokes the instruction in the memory, the following steps are executed:

receiving a power control factor $D_{ii}^k$ sent by a vectoring control entity, where the power control factor $D_{ii}^k$ is a power control factor, acquired by the vectoring control entity, of the transmit end on a $k^{th}$ subcarrier, i indicates a serial number of the transmit end, $1 \le k \le K$, and K indicates a quantity of subcarriers;

if it is determined, according to the power control factor $D_{ii}^k$, that the power control factor $D_{ii}^k$ is less than a power gain factor $g_i^k$, of a current transmit signal of the $i^{th}$ transmit end, on the $k^{th}$ subcarrier, modifying the power gain factor $g_i^k$ of the current transmit signal is modified, so that a modified power gain factor $g'^k_i$ is less than or equal to the power control factor $D_{ii}^k$.

For example, after the modifying the power gain factor $g_i^k$ of the current transmit signal, the steps include:

updating a physical layer parameter of a line between the transmit end and an $i^{th}$ receive end according to the modified power gain factor $g_i^k$, where the $i^{th}$ receive end is one transceiver, corresponding to the transmit end, of M transceivers located at a far end; and sending the updated physical layer parameter to the $i^{th}$ receive end, so that the $i^{th}$ receive end accepts the updated physical layer parameter, and returns a physical layer parameter update response message to the transmit end.

For example, after the modifying the power gain factor $g_i^k$ of the current transmit signal, the steps include:

sending the modified power gain factor $g'^k_i$ to the $i^{th}$ receive end, so that the $i^{th}$ receive end updates a physical layer parameter of a line between the transmit end and an $i^{th}$ receive end according to the modified power gain factor $g'^k_i$, and sends the updated physical layer parameter to the transmit end receiving the updated physical layer parameter sent by the $i^{th}$ receive end, and sending a physical layer parameter update response message to the $i^{th}$ receive end.

For example, after the modifying the power gain factor $g_i^k$ of the current transmit signal, the steps include:

sending a power limit response message to the vectoring control entity.

Accordingly, to reduce signaling interactions, based on separately receiving a power limit response message sent by each transmit end, the vectoring control entity sends the precoding matrix to a precoder, so that the precoder performs precoding processing on a transmit signal of each transmit end by using the precoding matrix P.

In this embodiment of the present invention, a transmit end receives a power control factor $D_{ii}^k$, acquired by a vectoring control entity, of the transmit end on a $k^{th}$ subcarrier; and if it is determined, according to the received power control factor $D_{ii}^k$, that the power control factor $D_{ii}^k$ is less than a power gain factor $g_i^k$, of a current transmit signal of the transmit end, on the $k^{th}$ subcarrier, modifies the power gain factor $g_i^k$ of the current transmit signal, so that a modified power gain factor $g'^k_i$ is less than or equal to the power control factor $D_{ii}^k$. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

Figure 11:
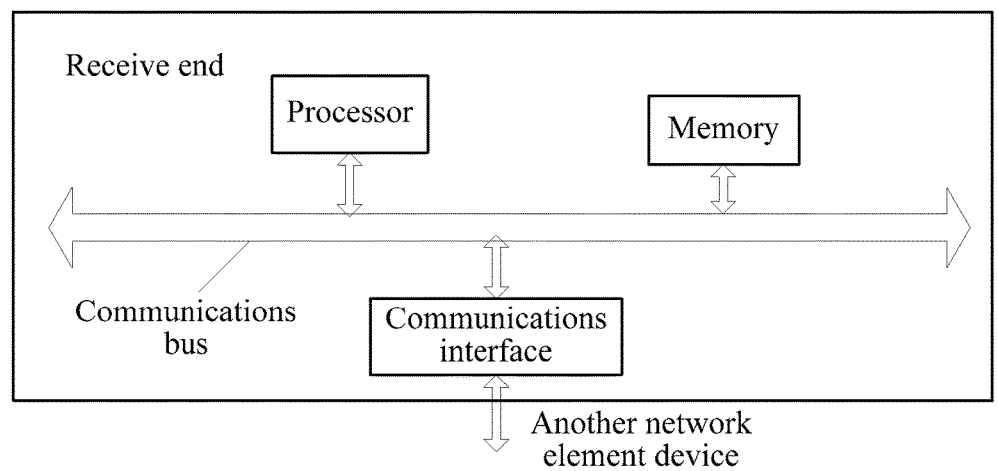
FIG. 11 is a schematic structural diagram of a receive end according to another embodiment of the present invention.

FIG. 11 is a schematic structural diagram of a receive end according to another embodiment of the present invention. The receive end is applied in a vectoring crosstalk cancellation system. The receive end is one transceiver of M transceivers located at a far end. As shown in FIG. 11, the receive end includes a processor, a memory, and a communications bus, where the memory stores an instruction for implementing a power control method, and the processor is connected to the memory through the communications bus. Furthermore, the receive end further includes a communications interface, so as to establish a communications connection with another network element device (for example, a vectoring control entity) by using the communications interface.

When the processor invokes the instruction in the memory, the following steps are executed:

receiving a power control factor $D_{ii}^k$ sent by a vectoring control entity, where the power control factor $D_{ii}^k$ is a power control factor, acquired by the vectoring control entity, of an $i^{th}$ transmit end on a $k^{th}$ subcarrier, the $i^{th}$ transmit end is one transceiver, corresponding to the receive end, of M transceivers located at a central office end, $1 \leq k \leq K$, and K indicates a quantity of subcarriers;

if it is determined, according to the power control factor $D_{ii}^k$, that the power control factor $D_{ii}^k$ is less than a power gain factor $g_i^k$, of a current transmit signal of the $i^{th}$ transmit end, on the $k^{th}$ subcarrier, modifying the power gain factor $g_i^k$ of the current transmit signal, so that a modified power gain factor $g'_i^k$ is less than or equal to the power control factor $D_{ii}^k$; and sending the modified power gain factor $g'_i^k$ to the $i^{th}$ transmit end.

For example, before the sending the modified power gain factor $g'_i^k$ to the $i^{th}$ transmit end, the steps include:

updating a physical layer parameter of a line between the $i^{th}$ transmit end and the receive end according to the modified power gain factor $g'_i^k$;

sending the updated physical layer parameter to the $i^{th}$ transmit end, where the updated physical layer parameter includes the modified power gain factor $g'_i^k$; and receiving a physical layer parameter update response message sent by the $i^{th}$ transmit end.

For example, after the sending the modified power gain factor $g'_i^k$ to the $i^{th}$ transmit end, the steps include:

receiving an updated physical layer parameter sent by the $i^{th}$ transmit end, where the updated physical layer parameter is a physical layer parameter, of a line between the $i^{th}$ transmit end and the receive end, updated by the $i^{th}$ transmit end according to the modified power gain factor $g'_i^k$; and returning a physical layer parameter update response message to the $i^{th}$ transmit end.

It should be noted that, after the receive end and a transmit end (the $i^{th}$ transmit end) corresponding to the receive end negotiate a new physical layer parameter, the $i^{th}$ transmit end sends a power limit response message to the vectoring control entity.

Accordingly, after receiving a power limit response message sent by each transmit end, the vectoring control entity sends the foregoing acquired precoding matrix P to a precoder, so that the precoder performs precoding processing on a transmit signal of each transmit end by using the precoding matrix P.

In this embodiment of the present invention, a receive end receives a power control factor $D_{ii}^k$, acquired by a vectoring control entity, of an $i^{th}$ transmit end on a $k^{th}$ subcarrier; and if it is determined, according to the received power control factor $D_{ii}^k$, that the power control factor $D_{ii}^k$ is less than a power gain factor $g_i^k$, of a current transmit signal of the $i^{th}$ transmit end, on the $k^{th}$ subcarrier, modifies the power gain factor $g_i^k$ of the current transmit signal, so that a modified power gain factor $g'_i^k$ is less than or equal to the power control factor $D_{ii}^k$, and sends the modified power gain factor $g'_i^k$ to the $i^{th}$ transmit end. Because a power control factor $D_{ii}^k$ corresponding to each transmit end is independent, a power control factor of each line is independent, and does not affect power control factors of other lines, so that when power control is performed on a transmit signal of a transmit end of a line, transmit signals of transmit ends of other lines are not weakened, and signal transmission performance of an entire line is not reduced; therefore, a problem, existing in a power control method in the prior art, that signal transmission performance of an entire line is reduced can be resolved.

Meanwhile, each transmit end limits transmit power of a transmit signal according to a power control factor sent by the vectoring control entity, and therefore, a transmit signal of each transmit end can also meet a requirement of transmit power control without a need for performing normalized scaling on a precoding matrix P. Since in this embodiment, normalized scaling is not performed on a precoding matrix P, accordingly, an FEQ matrix also does not need to be multiplied by a recovery factor, so that complexity of power control can be reduced without a need for switching precoding and an FEQ simultaneously.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A power control method, applied in a vectoring crosstalk cancellation system, the method comprising:
   acquiring, by a vectoring control entity, a power control factor $D_{ii}^k$ of an $i^{th}$ transmit end on a $k^{th}$ subcarrier, wherein the $i^{th}$ transmit end is one transceiver of M transceivers located at a central office end, $1 \le k \le K$, indicates a quantity of subcarriers in a channel between the $i^{th}$ transmit end and an $i^{th}$ receive end; and
   sending the power control factor $D_{ii}^k$ to the $i^{th}$ transmit end, so that if it is determined that the power control factor $D_{ii}^k$ is less than a power gain factor $g_i^k$ of a current transmit signal of the $i^{th}$ transmit end on the $k^{th}$ subcarrier, the $i^{th}$ transmit end modifies the power gain factor $g_i^k$ of the current transmit signal, so that a modified power gain factor $g'^k_i$ is less than or equal to the power control factor $D_{ii}^k$.

2. The method according to claim 1, after acquiring, by the vectoring control entity, the power control factor $D_{ii}^k$ of the $i^{th}$ transmit end on the $k^{th}$ subcarrier, the method further comprising:
   sending, by the vectoring control entity, the power control factor $D_{ii}^k$ to the $i^{th}$ receive end is one transceiver of M transceivers located at a remote end, so that if it is determined that the power control factor $D_{ii}^k$ is less than a power gain factor $g_i^k$ of the current transmit signal of the $i^{th}$ transmit end, on the $k^{th}$ subcarrier, the $i^{th}$ receive end (a) modifies the power gain factor $g_i^k$ of the current transmit signal, so that a modified power gain factor $g'^k_i$ is less than or equal to the power control factor $D_{ii}^k$, and (b) sends the modified power gain factor $g'^k_i$ to the $i^{th}$ transmit end.

3. The method according to claim 1, wherein acquiring, by the vectoring control entity, the power control factor $D_{ii}^k$ of the $i^{th}$ transmit end on the $k^{th}$ subcarrier further comprises:
   acquiring, by the vectoring control entity, a precoding matrix $P^k$ on the $k^{th}$ subcarrier; and
   calculating the power control factor $D_{ii}^k$ of the $i^{th}$ transmit end on the $k^{th}$ subcarrier by using an $i^{th}$ row vector and an $i^{th}$ column vector of the matrix $P^k$.

4. The method according to claim 2, after sending the power control factor $D_{ii}^k$ to the $i^{th}$ transmit end, or after sending, by the vectoring control entity, the power control factor $D_{ii}^k$ to an $i^{th}$ receive end, the method further comprising:
   receiving, by the vectoring control entity, a power limit response message sent by the $i^{th}$ transmit end.

5. A power control method, applied in a vectoring crosstalk cancellation system, the method comprising:
   receiving, by an $i^{th}$ transmit end, a power control factor $D_{ii}^k$ sent by a vectoring control entity, wherein the power control factor $D_{ii}^k$ is a power control factor acquired by the vectoring control entity of the $i^{th}$ transmit end on a $k^{th}$ subcarrier, the $i^{th}$ transmit end is one transceiver of M transceivers located at a central office end, $1 \le k \le K$, and K indicates a quantity of subcarriers in a channel between the $i^{th}$ transmit end and an $i^{th}$ receive end; and
   if it is determined that the power control factor $D_{ii}^k$ is less than a power gain factor $g_i^k$ of a current transmit signal of the $i^{th}$ transmit end, on the $k^{th}$ subcarrier, modifying the power gain factor $g_i^k$ of the current transmit signal, so that a modified power gain factor $g'^k_i$ is less than or equal to the power control factor $D_{ii}^k$.

6. The method according to claim 5, after modifying the power gain factor $g_i^k$ of the current transmit signal, the method comprising:
   updating, by the $i^{th}$ transmit end, a physical layer parameter of a line between the $i^{th}$ transmit end and an $i^{th}$ receive end according to the modified power gain factor $g'^k_i$, wherein the $i^{th}$ receive end is one transceiver of M transceivers located at a remote end; and
   sending the updated physical layer parameter to the $i^{th}$ receive end, so that the $i^{th}$ receive end receives the updated physical layer parameter, and returns a physical layer parameter update response message to the $i^{th}$ transmit end.

7. The method according to claim 5, after modifying the power gain factor $g_i^k$ of the current transmit signal, the method further comprising:
   sending, by the $i^{th}$ transmit end, the modified power gain factor $g'^k_i$ to the $i^{th}$ receive end, so that the $i^{th}$ receive end (a) updates a physical layer parameter of a line between the $i^{th}$ transmit end and the $i^{th}$ receive end according to the modified power gain factor $g'^k_i$, and (b) sends the updated physical layer parameter to the $i^{th}$ transmit end;
   receiving the updated physical layer parameter sent by the $i^{th}$ receive end; and
   sending a physical layer parameter update response message to the $i^{th}$ receive end.

8. The method according to claim 5, after modifying the power gain factor $g_i^k$ of the current transmit signal, the method further comprising:
   sending, by the $i^{th}$ transmit end, a power limit response message to the vectoring control entity.

9. A power control method, applied in a vectoring crosstalk cancellation system, the method comprising:
   receiving, by an $i^{th}$ receive end, a power control factor $D_{ii}^k$ sent by a vectoring control entity, wherein the power control factor $D_{ii}^k$ is a power control factor acquired by the vectoring control entity of an $i^{th}$ transmit end on a $k^{th}$ subcarrier, the $i^{th}$ transmit end is one transceiver of M transceivers located at a central office end, $1 \le k \le K$, K indicates a quantity of subcarriers in a channel between the $i^{th}$ transmit end and the $i^{th}$ receive end, and the $i^{th}$ receive end is one transceiver of M transceivers located at a remote end; and
   if it is determined that the power control factor $D_{ii}^k$ is less than a power gain factor $g_i^k$ of a current transmit signal of the $i^{th}$ transmit end, on the $k^{th}$ subcarrier, modifying the power gain factor $g_i^k$ of the current transmit signal, so that a modified power gain factor $g'^k_i$ is less than or equal to the power control factor $D_{ii}^k$; and
   sending the modified power gain factor $g'^k_i$ to the $i^{th}$ transmit end.

10. The method according to claim 9, before sending the modified power gain factor $g'^k_i$ to the $i^{th}$ transmit end, the method further comprising:
    updating, by the $i^{th}$ receive end, a physical layer parameter of a line between the $i^{th}$ transmit end and the $i^{th}$ receive end according to the modified power gain factor $g'^k_i$;
    sending the updated physical layer parameter to the $i^{th}$ transmit end, wherein the updated physical layer parameter comprises the modified power gain factor $g'^k_i$; and
    receiving a physical layer parameter update response message sent by the $i^{th}$ transmit end.

11. The method according to claim 9, after sending the modified power gain factor $g'^k_i$ to the $i^{th}$ transmit end, the method further comprising:
    receiving, by the $i^{th}$ receive end, an updated physical layer parameter sent by the $i^{th}$ transmit end, wherein the updated physical layer parameter is a physical layer parameter of a line between the $i^{th}$ transmit end and the $i^{th}$ receive end, updated by the $i^{th}$ transmit end according to the modified power gain factor $g'^{k}_{i}$; and returning a physical layer parameter update response message to the $i^{th}$ transmit end.

12. A non-transitory, computer readable medium storing instructions for execution by a computer device of a power control apparatus, located in a vectoring crosstalk cancellation system, wherein execution of the instructions by the computer device configures the computer device to perform a method of power control comprising:

acquiring a power control factor $D_{ii}^{k}$ of an $i^{th}$ transmit end on a $k^{th}$ subcarrier, wherein the $i^{th}$ transmit end is one transceiver of M transceivers located at a central office end, $1 \leq k \leq K$, and K indicates a quantity of subcarriers in a channel between the $i^{th}$ transmit end and an $i^{th}$ receive end; and sending to the $i^{th}$ transmit end the acquired power control factor $D_{ii}^{k}$, so that if it is determined that the power control factor $D_{ii}^{k}$ is less than a power gain factor $g_{i}^{k}$ of a current transmit signal of the $i^{th}$ transmit end on the $k^{th}$ subcarrier, the $i^{th}$ transmit end modifies the power gain factor $g_{i}^{k}$ of the current transmit signal, so that a modified power gain factor $g'^{k}_{i}$ is less than or equal to the power control factor $D_{ii}^{k}$.

13. The non-transitory, computer readable medium according to claim 12 further comprising instructions that, when executed, configure the computer device to:

send the power control factor $D_{ii}^{k}$ to an $i^{th}$ receive end, wherein the $i^{th}$ receive end is one transceiver of M transceivers located at a remote end, so that if it is determined that the power control factor $D_{ii}^{k}$ is less than a power gain factor $g_{i}^{k}$ of the current transmit signal of the $i^{th}$ transmit end on the $k^{th}$ subcarrier, the $i^{th}$ receive end (a) modifies the power gain factor $g_{i}^{k}$ of the current transmit signal, so that a modified power gain factor $g'^{k}_{i}$ is less than or equal to the power control factor $D_{ii}^{k}$, and (b) sends the modified power gain factor $g'^{k}_{i}$ to the $i^{th}$ transmit end.

14. The non-transitory, computer readable medium according to claim 12 further comprising instructions that, when executed, configure the computer device to:

acquire a precoding matrix $P^{k}$ on the $k^{th}$ subcarrier; and determine the power control factor $D_{ii}^{k}$ of the $i^{th}$ transmit end on the $k^{th}$ subcarrier by using an $i^{th}$ row vector and an $i^{th}$ column vector of the matrix $P^{k}$.

15. The apparatus non-transitory, computer readable medium according to claim 12 further comprising instructions that, when executed, configure the computer device to:

receive a power limit response message sent by the $i^{th}$ transmit end.

16. A non-transitory, computer readable medium storing instructions for execution by a computer device of a power control apparatus located at a transmit end of a vectoring crosstalk cancellation system, wherein the transmit end is one transceiver of M transceivers located at a central office end of the system, wherein execution of the instructions by the computer device configures the computer device to perform a method of power control comprising:

receiving a power control factor $D_{ii}^{k}$ sent by a vectoring control entity, wherein the power control factor $D_{ii}^{k}$ is a power control factor acquired by the vectoring control entity of the transmit end on a $k^{th}$ subcarrier, $1 \leq i \leq M$, i indicates a serial number of the transmit end, $1 \leq k \leq K$, and K indicates a quantity of subcarriers in a channel between the $i^{th}$ transmit end and an $i^{th}$ receive end; and modifying the power gain factor $g_{i}^{k}$ of the current transmit signal, so that a modified power gain factor $g'^{k}_{i}$ is less than or equal to the power control factor $D_{ii}^{k}$ if it is determined that the power control factor $D_{ii}^{k}$ is less than a power gain factor $g_{i}^{k}$ of a current transmit signal of the transmit end, on the $k^{th}$ subcarrier.

17. The non-transitory, computer readable medium according to claim 16 further comprising instructions that, when executed, configure the computer device to:

update a physical layer parameter of a line between the transmit end and a corresponding receive end according to the modified power gain factor $g'^{k}_{i}$, wherein the corresponding receive end is one transceiver of M transceivers located at a remote end; and send to the corresponding receive end, the updated physical layer parameter, so that the corresponding receive end (a) accepts the updated physical layer parameter, and (b) returns a physical layer parameter update response message to the transmit end.

18. The non-transitory, computer readable medium according to claim 16 further comprising instructions that, when executed, configure the computer device to:

send the modified power gain factor $g'^{k}_{i}$ to the corresponding receive end, so that the corresponding receive end (a) updates a physical layer parameter between a line between the corresponding receive end and the transmit end according to the modified power gain factor $g'^{k}_{i}$, and (b) sends the updated physical layer parameter to the transmit end; and receive the updated physical layer parameter sent by the corresponding receive end, so that a physical layer parameter update response message is sent to the corresponding receive end.

19. The non-transitory, computer readable medium according to claim 16 further comprising instructions that, when executed, configure the computer device to:

send a power limit response message to the vectoring control entity.

20. A non-transitory, computer readable medium storing instructions for execution by a computer device of a power control apparatus, located at a receive end of a vectoring crosstalk cancellation system, wherein the receive end is one transceiver of M transceivers located at a remote end of the system, wherein execution of the instructions by the computer device configures the computer device to perform a method of power control comprising:

receiving a power control factor $D_{ii}^{k}$ sent by a vectoring control entity, wherein the power control factor $D_{ii}^{k}$ is a power control factor, acquired by the vectoring control entity, of an $i^{th}$ transmit end on a $k^{th}$ subcarrier, the $i^{th}$ transmit end is one transceiver of M transceivers located at a central office end, $1 \leq k \leq K$, and K indicates a quantity of subcarriers in a channel between the $i^{th}$ transmit end and an $i^{th}$ receive end;

modifying the power gain factor $g_{i}^{k}$ of the current transmit signal, so that a modified power gain factor $g'^{k}_{i}$ is less than or equal to the power control factor $D_{ii}^{k}$ if it is determined that the power control factor $D_{ii}^{k}$ is less than a power gain factor $g_{i}^{k}$ of a current transmit signal of the $i^{th}$ transmit end, on the $k^{th}$ subcarrier; and sending the modified power gain factor $g'^{k}_{i}$ to the $i^{th}$ transmit end.

21. The non-transitory, computer readable medium according to claim 20 further comprising instructions that, when executed, configure the computer device to:

update a physical layer parameter of a line between the $i^{th}$ transmit end and the $i^{th}$ receive end according to the modified power gain factor $g'_i{}^k$; wherein send the updated physical layer parameter to the $i^{th}$ transmit end, wherein the updated physical layer parameter comprises the modified power gain factor $g'_i{}^k$; and receiving a physical layer parameter update response message sent by the $i^{th}$ transmit end.

22. The non-transitory, computer readable medium according to claim 20 further comprising instructions that, when executed, configure the computer device to:

receive an updated physical layer parameter sent by the $i^{th}$ transmit end, wherein the updated physical layer parameter is a physical layer parameter of a line between the $i^{th}$ transmit end and the receive end, updated by the $i^{th}$ transmit end according to the modified power gain factor $g'_i{}^k$; and send a physical layer parameter update response message to the $i^{th}$ transmit end.

23. A vectoring control entity, applied in a vectoring crosstalk cancellation system comprising a processor, a memory and a communications bus, wherein the memory stores an instruction for implementing a power control method, and the processor is connected to the memory through the communications bus; and when the processor invokes the instruction in the memory, the processor is configured to:

acquire a power control factor $D_{ii}{}^k$ of an $i^{th}$ transmit end on a $k^{th}$ subcarrier, wherein the $i^{th}$ transmit end is one transceiver of M transceivers located at a central office end, $1 \le k \le K$, and K indicates a quantity of subcarriers in a channel between the $i^{th}$ transmit end and an $i^{th}$ receive end; and send the power control factor $D_{ii}{}^k$ to the $i^{th}$ transmit end, so that if it is determined that the power control factor $D_{ii}{}^k$ is less than a power gain factor $g_i{}^k$ of a current transmit signal of the $i^{th}$ transmit end, on the $k^{th}$ subcarrier, the $i^{th}$ transmit end modifies the power gain factor $g_i{}^k$ of the current transmit signal, so that a modified power gain factor $g'_i{}^k$ is less than or equal to the power control factor $D_{ii}{}^k$.

24. A transmit end, applied in a vectoring crosstalk cancellation system, wherein the transmit end is one transceiver of M transceivers located at a central office end, and the transmit end comprises a processor, a memory and a communications bus, wherein the memory stores an instruction for implementing a power control method, and the processor is connected to the memory through the communications bus; and when the processor invokes the instruction in the memory, the processor is configured to:

receive a power control factor $D_{ii}{}^k$ sent by a vectoring control entity, wherein the power control factor $D_{ii}{}^k$ is a power control factor acquired by the vectoring control entity of the transmit end on a $k^{th}$ subcarrier, i indicates a serial number of the transmit end, $1 \le k \le K$, and K indicates a quantity of subcarriers in a channel between the $i^{th}$ transmit end and an $i^{th}$ receive end; and if it is determined that the power control factor $D_{ii}{}^k$ is less than a power gain factor $g_i{}^k$ of a current transmit signal of the $i^{th}$ transmit end on the $k^{th}$ subcarrier, modify the power gain factor $g_i{}^k$ of the current transmit signal, so that a modified power gain factor $g'_i{}^k$ is less than or equal to the power control factor $D_{ii}{}^k$.

25. A receive end, applied in a vectoring crosstalk cancellation system, wherein the receive end is one transceiver of M transceivers located at a remote end, and the receive end comprises a processor, a memory and a communications bus, wherein the memory stores an instruction for implementing a power control method, and the processor is connected to the memory through the communications bus; and when the processor invokes the instruction in the memory, the processor is configured to:

receive a power control factor $D_{ii}{}^k$ sent by a vectoring control entity, wherein the power control factor $D_{ii}{}^k$ is a power control factor acquired by the vectoring control entity of an $i^{th}$ transmit end on a $k^{th}$ subcarrier, the $i^{th}$ transmit end is one transceiver of M transceivers located at a central office end, $1 \le k \le K$, and K indicates a quantity of subcarriers in a channel between the $i^{th}$ transmit end and an $i^{th}$ receive end;

if it is determined that the power control factor $D_{ii}{}^k$ is less than a power gain factor $g_i{}^k$ of a current transmit signal of the $i^{th}$ transmit end on the $k^{th}$ subcarrier, modify the power gain factor $g_i{}^k$ of the current transmit signal, so that a modified power gain factor $g'_i{}^k$ is less than or equal to the power control factor $D_{ii}{}^k$; and send the modified power gain factor $g'_i{}^k$ to the $i^{th}$ transmit end.

* * * * *